(12) United States Patent
Kim et al.

(10) Patent No.: US 11,521,438 B2
(45) Date of Patent: *Dec. 6, 2022

(54) USING SOUND TO DETERMINE VEHICLE HEALTH

(71) Applicant: Zoox, Inc., Foster City, CA (US)

(72) Inventors: Nicholas Nakjoo Kim, San Jose, CA (US); Daniel David Baker, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/306,499

(22) Filed: May 3, 2021

(65) Prior Publication Data

US 2021/0335064 A1    Oct. 28, 2021

Related U.S. Application Data

(63) Continuation-in-part of application No. 16/856,733, filed on Apr. 23, 2020, and a continuation-in-part of application No. 16/856,597, filed on Apr. 23, 2020.

(51) Int. Cl.
| | |
|---|---|
| *H04N 5/44* | (2011.01) |
| *G07C 5/08* | (2006.01) |
| *G07C 5/00* | (2006.01) |
| *G06F 16/635* | (2019.01) |
| *G06F 16/65* | (2019.01) |
| *G06F 17/14* | (2006.01) |

(52) U.S. Cl.
CPC ......... *G07C 5/0833* (2013.01); *G06F 16/635* (2019.01); *G06F 16/65* (2019.01); *G07C 5/006* (2013.01); *G07C 5/008* (2013.01); *G06F 17/14* (2013.01)

(58) Field of Classification Search
CPC ...... G07C 5/0833; G07C 5/006; G07C 5/008; G06F 16/635; G06F 16/65; G06F 17/14
See application file for complete search history.

(56) References Cited

U.S. PATENT DOCUMENTS

| | | | |
|---|---|---|---|
| 2016/0163130 A1 | 6/2016 | Zagajac et al. | |
| 2017/0116793 A1* | 4/2017 | Lin | G07C 5/008 |
| 2017/0125034 A1 | 5/2017 | Kakadiaris et al. | |
| 2018/0204398 A1* | 7/2018 | Smith | G07C 5/0808 |

(Continued)

FOREIGN PATENT DOCUMENTS

| | | |
|---|---|---|
| DE | 102016114048 A1 | 2/2018 |
| DE | 102017111901 A1 | 12/2018 |

(Continued)

OTHER PUBLICATIONS

Office Action for U.S. Appl. No. 16/856,733, dated Jun. 10, 2022, Claessens, "Predicting Vehicle Health", 27 pages.

(Continued)

*Primary Examiner* — Munear T Akki
(74) *Attorney, Agent, or Firm* — Lee & Hayes, P.C.

(57) ABSTRACT

Systems and methods cause a component of a vehicle to activate. The systems and methods receive audio data generated by a microphone of the vehicle, where the audio data represents sound of the component. Based on the audio data, a condition of the vehicle or the component may be determined, and based on the condition, the vehicle may be commissioned for use or decommissioned.

20 Claims, 8 Drawing Sheets

(56) References Cited

U.S. PATENT DOCUMENTS

| | | | |
|---|---|---|---|
| 2019/0051414 A1* | 2/2019 | Lyubich | G16H 20/60 |
| 2019/0066399 A1* | 2/2019 | Jiang | G07C 5/008 |
| 2019/0080528 A1* | 3/2019 | Bednar | G07C 5/006 |
| 2020/0043258 A1* | 2/2020 | Jiang | G07C 5/0825 |
| 2021/0192860 A1 | 6/2021 | Kale et al. | |
| 2021/0335061 A1 | 10/2021 | Claessens et al. | |
| 2021/0335062 A1 | 10/2021 | Claessens et al. | |
| 2021/0342211 A1 | 11/2021 | Melo et al. | |

FOREIGN PATENT DOCUMENTS

| | | |
|---|---|---|
| FR | 2814841 A1 | 4/2002 |
| RU | 2615806 C1 | 4/2017 |

OTHER PUBLICATIONS

PCT Search Report and Written Opinion dated Jul. 15, 2021 for PCT Application No. PCT/US21/26906, 9 pages.

* cited by examiner

USING SOUND TO DETERMINE VEHICLE HEALTH

CROSS-REFERENCE TO RELATED APPLICATIONS

This application is a Continuation-in-Part of and claims priority to U.S. application Ser. No. 16/856,597, filed Apr. 23, 2020, and U.S. patent application Ser. No. 16/856,733, filed Apr. 23, 2020, which are incorporated by reference herein in their entireties and for all purposes

BACKGROUND

Vehicles include a wide range of components or systems that may be defective, need servicing, and/or replacement. Conventionally, as part of manufacturing the vehicle, technicians or other trained individuals may perform tests before the vehicle is commissioned. Such processes can be time consuming, resource-intensive, and introduces human-perceived error. In such instances, vehicles with defective components may be distributed to end users. Additionally, throughout a lifespan of the vehicle, such components may become worn and/or fail. Traditionally, vehicles may rely on periodic service to diagnose and detect wear. However, servicing the vehicle may be inconvenient and result in downtime. Further, untimely service may result in irreparable damage, thus resulting in a greater expense to replace the component.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
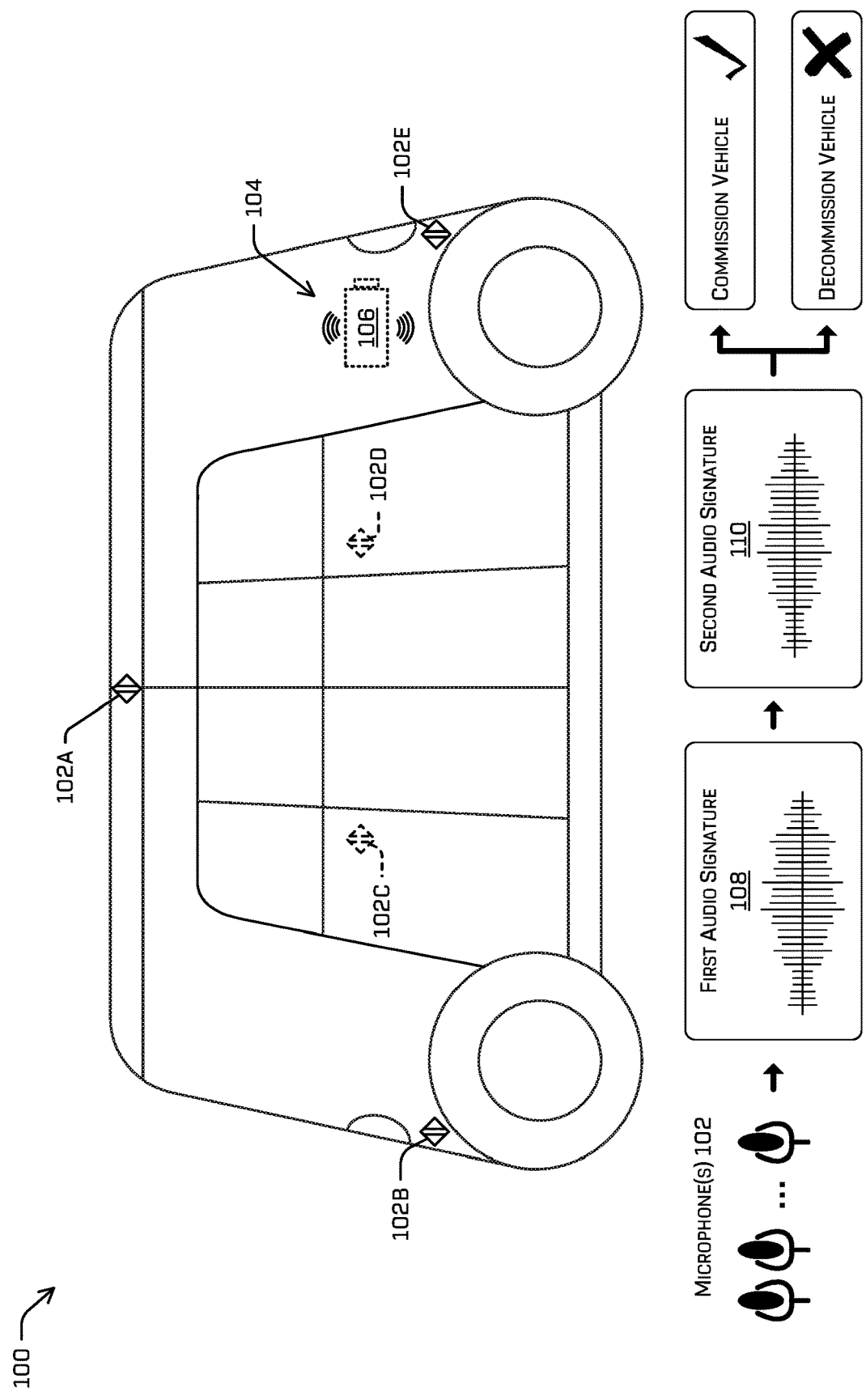
FIG. 1 illustrates an example vehicle including one or more microphones for monitoring a health of a vehicle, or components of the vehicle, according to an example of the present disclosure.

This application relates to systems and methods that determine a health of a vehicle using sound. The vehicle may include one or more sensors, such as microphones, that continuously or periodically monitor sound in an interior and/or exterior environment of the vehicle and generate audio data associated with the sound for use in determining whether the vehicle, or components thereof, are functioning properly (e.g., healthy). The audio data generated by the microphones, for example, may represent acoustic characteristics associated with components of the vehicle (e.g., motors, fans, brake calipers, pumps, seals, etc.) or vehicle systems (e.g., heating ventilation and air conditioning (HVAC), suspension system, computing hardware, etc.). In some instances, an audio signature representative of the component may be compared against a reference audio signature to determine whether components of the vehicle (or more generally, the vehicle) are functioning properly (e.g., condition, state, status, etc.). For example, after manufacture of the vehicle, the vehicle may undergo an end of line (EOL) test before the vehicle is commissioned. During the EOL test, the components of the vehicle may be turned on and/or off and the microphones may capture sound representative of their performance. If the audio signature deviates from the reference audio signature this may be indicative of a fault of one or more of the component(s). In such instances, the vehicle may be serviced before being commissioned (e.g., put into service). Alternatively, if the comparison of the audio signature and the reference audio signature yields that the vehicle is functioning properly, the vehicle may be commissioned for use. In some instances, the vehicle, or a monitoring system associated with the vehicle, may be able to determine differences in the audio signatures for use in determining whether the vehicle is functioning properly, as well as the components within the vehicle that may need servicing and/or replacement. Moreover, throughout a life of the vehicle, the microphones may continuously, periodically, and/or upon occurrence of an event generate audio signatures for comparison against reference audio signatures. In this manner, vehicle health may be monitored throughout the lifespan of the vehicle, and changes in audio signature(s) and reference audio signature(s) may be used to detect faults and/or predict failures before components fail. Moreover, human-perceivable sounds produced by components of the vehicle may be analyzed to determine whether the sounds are obnoxious, irritating, and/or indicative of failures.

The microphones may be disposed within the vehicle, external to the vehicle, within components of the vehicle, and so forth. In some instances, the microphones may be arranged to detect speech of an occupant of the vehicle, as opposed to aftermarket or microphones of test equipment. In this manner, the microphones that capture speech input of the occupant may also be utilized to generate the audio signatures. As such, during testing, the microphones may be used for capturing audio for use in determining a health of the vehicle, whereas when the vehicle is in use, the microphones may be used for capturing audio of the occupant and responding to speech input.

In some instances, a first audio signature (e.g., reference, baseline, initial, original, etc.) may be determined for a component of a vehicle. The first audio signature may include acoustic characteristics captured by the microphones. In some instances, the first audio signature may be determined during a bench test of the component or based on audio data captured by another vehicle determined to be functioning properly. In other words, an audio signature of a properly functioning or healthy component may be utilized as the first audio signature. The first audio signature may be determined at a first time (e.g., baseline test), and during the first time, the vehicle may perform one or more operations associated with causing the component to activate such that the audio data associated with the component may be captured by the microphone(s). In some instances, the vehicle may cycle the component through available settings and/or under multiple operating conditions (e.g., different operating speeds, such as high, medium, and/or low, while the vehicle is moving at different rates of speed, with one or more doors or windows open and closed, etc.) to isolate the audio signature associated with the component under various operating conditions. The component may also be run for different periods of time prior to testing (e.g., the sound may be monitored at the time of startup, after the component has been running for 1 min, 10 minutes, 1 hour, etc.). This may also ensure that the component is properly functioning across available settings and/or during prolonged use. In turn, the audio data may be used to determine the first audio signature of the component. In instances where the component is cycled through available settings and/or after multiple durations of use, multiple first audio signatures may be generated. In these instances, the component may be associated with a known or commanded state, and the multiple first audio signatures may be associated with the known or commanded state of the component.

Additionally, a second audio signature (e.g., progressive, real-time, current, etc.) may be determined for the component of the vehicle at a second time that is subsequent to the first time such as during the EOL test, when the vehicle is put back into service after maintenance, at periodic intervals (e.g., daily, weekly, monthly, etc.), after a predetermined period of operation (measured in terms of time or distance), upon the occurrence of an event (e.g., a collision, an adverse weather condition, a detected fault or error of a component, etc.). At the second time, the vehicle may perform one or more operations associated with causing the component to activate such that the audio data associated with the component may be captured by the microphone(s). The second audio signature may then be compared to the first audio signature in order to determine a health associated with the component. More generally, the first audio signature and the second audio signature may be used to determine conditions, operational states, or statuses of the component. That is, after establishing the first audio signature, the second audio signature may be compared against the first audio signature to see if the audio signature has changed and to determine whether the component is functioning properly. In instances where the component includes multiple settings, in some instances, second audio signatures associated with any or all of the respective settings may be captured for comparison to respective first audio signatures. That is, the component may be instructed to a known or commanded state for comparison of the second audio signatures and the first audio signatures.

In some instances, an audio signature (e.g., the first audio signature and the second audio signature) may include data representing a series of measurements generated by the microphones over time, or during a window of time. The sample rate and characteristics of the audio data may vary depending on the component(s) being tested. For example, certain components may have certain frequencies, and amount of time over which the audio data is captured may be based on the component(s) being tested. In some instances, the audio signature may include raw audio data, while in other instances, the audio data may be filtered (e.g., to remove noise), compressed, enhanced, or otherwise processed to obtain the audio signature. As such, the audio data may be processed (e.g., filtered) to remove at least some of the background noise from the audio data. In this way, the portion of the audio signature attributable to the component may be isolated and/or the quality of the acoustic signature of the audio data may be improved to better monitor vehicle health. Further processing may also be performed to filter the noise based on certain frequencies or audible sounds capable of being heard by occupants of the vehicle.

In some instances, the audio signature may comprise a digital audio data stored in a known audio encoding format, such as WAV, MP3, advanced audio coding (AAC), Opus, Vorbis, or the like. Further, in some instances, the audio signature may include information derived from the raw audio data using, for example, one or more fast Fourier transforms (FFTs), Laplace transforms, principle component analysis, harmonic decomposition, and/or any other method of determining features associated therewith. Additionally, processing the audio data may include setting limits for a signal-to-noise ratio of the audio data, setting a target frequency of the audio data, including performing FFT processing on the audio data to transform the audio data from a time domain to a frequency domain, and the like.

In some instances, the vehicle may determine the first audio signatures for multiple components of the vehicle. For example, first audio signatures may be generated for a fan of the HVAC system, an air conditioning (AC) compressor of the HVAC system, a pump of the HVAC system, and so forth. In some instances, the first audio signatures that are generated, or which components of the vehicle are being tested, may be based a test sequence as part of the EOL test. That is, the vehicle may undergo a test sequence that tests various components of the vehicle. Here, the first audio signatures may be respectively compared against the second audio signatures. In this sense, the vehicle may be put through the test sequence for determining whether the components and/or vehicle system(s) are functioning properly, prior to commissioning the vehicle for use (in the case of a new vehicle) or putting the vehicle back into use (in the case of a previously used vehicle). For example, as part of the test sequence, the HVAC system may be tested, computing hardware may be tested, the air suspension compressor may be tested, and so forth. In some instances, this may involve turning on and off components of the vehicle, cycling through settings of the components (e.g., AC compressor low, medium, and high), and/or changing operating parameters (e.g., vehicle idle, vehicle in transmit, etc.).

The components of the vehicle may be tested consecutively by selectively activating the components. This may, in some instances, isolate sounds generated by the component to determine the health of specific components of the vehicle. For example, while testing a fan of the HVAC system, the AC compressor and/or the pump may be deactivated. As another example, while testing the HVAC system, an air suspension compressor may be deactivated. Additionally, or alternatively, multiple components of the vehicle may be tested concurrently. Here, the microphones may capture second audio signature(s) associated with the components, and using signal processing techniques, the second audio signatures of the components may be isolated from one another. For example, knowing which components are activated during a certain test, the second audio signatures may be isolated based on their frequency, pitch, amplitude, and so forth. In some instances, the components may be calibrated (e.g., current sent to motors can be profiled based on motor RPM) to reduce sounds generated by components due to variations in manufacture, tolerance stacks, and the like.

In some instances, a machine learned model may be trained to determine one or more components of a vehicle associated with the audio data and/or an audio signature. For example, based on the audio data, the machine learned model may determine a component of the vehicle that produced/generated the specific audio data, or a portion of the audio data generated by a component. This may, for example, allow multiple component(s) of the vehicle to be tested at once, as compared to, for example, individually testing the components (as noted above).

Additionally, or alternatively, the machine learned model may be trained to detect differences between the first audio signatures and the second audio signatures for use in determining a health, condition, status, and so forth of components of the vehicle. For example, the audio data and/or second audio signature may be input into the machine learned model, and, in response, the machine learned model may compare the second audio signature to the first audio signature (e.g., the reference audio signature) to determine whether the component is functioning properly. In this manner, the machine learned model may be able to identify those components that are of concern before commissioning the vehicle. The machine learned model may be trained from training data comprised of audio data that has been labeled to indicate when different components turn on and off or cycle through operational states, and to indicate which components are functioning properly and which components are not functioning properly. The machine learned model may also determine a probability associated with a likelihood of the component functioning properly or not functioning properly. Different components may be cycled in a variety of combinations and the disclosed techniques can be used to determine a faulted, improperly installed, or otherwise improperly operating component through detection of a corresponding audio signature.

In some instances, multiple audio signatures may be compared depending on the audio data, the format of the audio signatures, and/or the criteria upon which the audio signatures are compared. For example, the criteria to be compared may include frequency (including sets of frequencies), magnitude, tonality, visual appearance of a wave form, etc. By way of example and not limitation, audio signatures may be compared based on their similarity in time domain (with and/or without a shift), their similarity in frequency domain (with and/or without a shift), and/or similarity in energy or power. In some examples, the comparisons may be performed based on a weighted representation of any or all of these or other criteria. Comparisons may be made over an entire correlation vector to measure total general correlation and/or over only values in a correlation vector that surpass a threshold value (e.g., to filter out noise, echoes, etc.).

To illustrate a process for testing a component, envision that after manufacturing a vehicle, or during manufacture of the vehicle, a component of the vehicle may be activated. For example, an AC compressor may be activated and/or turned on to a desired setting (e.g., speed). Microphones may capture sound (e.g., audio data) associated with the AC compressor over a period of time, and generate, a first audio signature that is used as a reference audio signature to which other audio signatures are compared. For example, the first audio signature may be determined to be indicative of a properly functioning AC compressor. This decision, in some instances, may be aided by technicians, a bench test, previously captured audio signatures, and so forth. The first audio signature may be stored for comparison to other audio signatures.

Moreover, the first audio signature may be associated with operating conditions (or parameters) of the vehicle (and/or components, subcomponents, etc.). As non-limiting examples, the first audio signature may be associated with an engine speed, operating status of other components (e.g., HVAC temperature and/or fan speed), brake pressure, and the like. In additional examples, the first audio signature may be associated with a speed of the vehicle, speed of the component (e.g., translational or rotational), steering angle, environmental air temperature, environmental humidity, environmental weather (e.g., rain, snow, sunny, etc.), component temperature, time of day, barometric pressure (e.g., altitude), and the like. For example, the components of the vehicle may be tested while the vehicle is parked (e.g., not moving, static, etc.) and/or while the vehicle is in transmit (e.g., moving, dynamic, etc.). In such instances, the microphones may generate multiple first audio signatures. For example, continuing with the above example, a first audio signature associated with the AC compressor may be generated while the vehicle is parked and while the AC compressor is activated. Additionally, another first audio signature associated with the AC compressor may be generated while the vehicle is in transmit and while the AC compressor is activated. The first audio signatures may be stored for use in testing subsequent AC compressors as part of EOL testing.

Additionally, while generating the first audio signature for the AC compressor, other components of the vehicle may be controlled. For instance, the vehicle may run the fan through various settings of the AC compressor while controlling operation of other components and/or after multiple durations of use. In this way, the component being activated may be isolated under various operating conditions to record the first audio signature. Additionally, controlling operation of the other components according to the operating parameter may allow for more consistent measurements associated with the audio signatures. The AC compressor may also be run for different periods of time prior to testing (e.g., the sound may be monitored at the time of startup, after the component has been running for 1 min, 10 minutes, 1 hour, etc.).

As subsequent vehicles are manufactured, as part of an EOL test and before commissioning the vehicle, the AC compressors may be activated. Herein, microphones of the vehicles may generate second audio signatures that are compared to the first audio signature to identify whether the AC compressors are functioning properly or are not functioning properly (e.g., faults). This may be accomplished in part by a machine learned model to identify properly functioning AC compressors. Those vehicles with properly functioning AC compressors may be commissioned for use, whereas those vehicles with improperly functioning AC compressors may be serviced and/or replaced.

In some instances, the EOL test may repeat for other components and/or system(s) of the vehicle, whether during or subsequent to testing the AC compressor. As such, any number of components may be tested as part of the EOL test, and in such instances, respective second audio signatures may be comped against previously generated first audio signatures to identify faulty components.

Additionally, although the discussion is with regard to performing the EOL test prior to commissioning the vehicle, a health of the vehicle, or components thereof, may be continuously determined or during scheduled intervals. For example, it is envisioned that during the life of a vehicle, components become worn and, in some instances, produce greater amounts of noise. Here, first audio signatures may be compared against the subsequently generated second audio signatures. For example, continuing with the above example, a first audio signature may be used during the EOL test, and another first audio signature may be used for testing the AC compressor after 5,000 miles. The first audio signature associated with the with AC compressor after 5,000 miles may be representative of a properly functioning AC compressor. As vehicles that have traveled 5,000 miles are tested, second audio signatures may be generated and compared against the first audio signature. As such, the first audio signatures and the second audio signatures may be used to monitor the health of the vehicle. However, the components of the vehicle may be tested according to other intervals (e.g., daily, weekly, monthly, etc.) and/or may be tested based on the occurrence of one or more events (e.g., when the vehicle is out of service, when the vehicle is charging, when the vehicle is parked, when the vehicle is in transit, etc.).

Although the above discussion is with regard to using a first audio signature associated with a healthy component, an audio signature of a faulty or worn component may be generated. Such audio signature may be compared against the second audio signatures, and if the second audio signatures and the audio signature are different, this may indicate that the component is functioning properly. If similar, however, this may be indicative of a faulty component. Here, additionally, the audio signatures may be used to determine a condition or operational state of the component.

Additionally, in some instances, the audio signatures may be associated with data generated by other sensor(s) of the vehicle. For example, additional sensor(s) of the vehicle may measure forces experienced by components of the vehicle, electrical currents, temperatures, and so forth. This data be logged and evaluated over time to monitor the health of the vehicle, identify faulty components, or to draw correlations between operating conditions and a failure of components. Moreover, the discussion herein is with regard to using microphones to measure the health of the vehicle, other sensors may be additionally, or alternatively used. For example, inertial measurement units (IMUs), temperature sensors, image sensors, piezoelectric sensors, pressure sensors, accelerometers, air quality sensors, voltage sensors, current sensors, etc.) may generate sensor data, which may additionally, or alternatively, be used. Here, outputs of any of the other types of sensors described may be used in addition to or instead of audio data to generate sensor signatures, as inputs to machine learned models, or the like.

The audio data and/or the audio signatures may further be used for determining a vehicle health in other ways. For example, the audio data may be processed and/or filtered to analyze psychoacoustic properties (e.g., decibel level, sharpness, prominence ratio, spectrum shape, etc.) as perceived by humans. These psychoacoustic properties may then be compared to thresholds for use in determine whether the component is defective. The psychoacoustic properties may provide insight into sound as perceived by the human ear (e.g., occupants of the vehicle). If the values of the psychoacoustic properties are indicate that the component is loud, or includes sounds that are unpleasant to the occupants of the vehicle, this components may be determined to be defective. As such, components that generate sound that is unpleasant for occupants may be outside acceptable thresholds and may be defective. In some examples, audio that may be perceived by a human can be characterized and used to modify operation of one or more vehicle components or component designs. For example, it may be determined that an impeller for moving air within a climate control system may degrade over time and begin generating noise, possibly at certain frequencies of operation. The disclosed techniques may detect failed or degraded components and such information can be used to schedule maintenance, change operation of the device (e.g., avoiding certain frequencies of an electric motor), or change a design of a component.

As such, the systems and method described herein allow for the components and/or vehicle health to be determined in real-time, using microphones of the vehicle, and before components fail. Such systems and methods enable the determination of component failure and/or anomalies without human interference (e.g., in the case of driverless and/or autonomous vehicles when an occupant of the vehicle may not be present to determine when a component is wearing out, failing or otherwise experiencing an anomaly). In this way, servicing the vehicle and/or the component may be performed at a convenient time prior to failure, thereby avoiding costly downtime and avoiding damage to other components. Additionally, in some examples, periodic preventive service may be avoided and service may be performed only when necessary. This can avoid unnecessary downtime and allow vehicle components to reach their maximum life expectancy, instead of prematurely replacing and/or repairing vehicle components for precautionary reasons. The techniques described herein determine audio signatures associated with components, and then evaluate those audio signatures over time to accurately monitor vehicle health. The systems and methods utilize pre-existing microphones of the vehicle, which may eliminate the need for additional and/or expensive monitoring or diagnostic sensors. In some instances, the systems and methods describe herein may be configured to determine the health of the components using sounds captured within the vehicle for speech processing. That is, the microphones of the vehicle may capture speech input (e.g., commands) and using this speech input, may both determine the health of the vehicle and respond to user commands.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 is a schematic view of an example vehicle 100 including a plurality of microphones 102A-102E (hereinafter referred to collectively as "the microphones 102" or singularly as "the microphone 102"). In example shown in FIG. 1, the vehicle 100 is a bidirectional, autonomous vehicle that is capable of navigating between locations without human control or intervention. As used herein, a bidirectional vehicle is one that is configured to switch between traveling in a first direction of the vehicle 100 and a second, opposite, direction of the vehicle 100. In other words, there is no fixed "front" or "rear" of the vehicle 100.

Rather, whichever longitudinal end of the vehicle 100 is leading at the time becomes the "front" and the trailing longitudinal end becomes the "rear." However, the techniques described herein may be applied to vehicles other than bidirectional vehicles, including autonomous, semi-autonomous, or manually driven vehicles, and robots, and the like.

The microphones 102 may be disposed on an exterior of the vehicle 100 and/or within an interior of the vehicle 100 (e.g., within a passenger compartment) to measure various sounds. In some instances, the microphones 102 may be arranged to capture speech input of occupants within the vehicle 100, as well as for use in capturing audio of the components to determine component health. The microphones 102, whether disposed on the exterior and/or the interior, may be disposed in various locations. For example, in the illustrated example, the microphones 102 include a first microphone 102A, a second microphone 102B, a third microphone 102C, a fourth microphone 102D, and a fifth microphone 102E. The first microphone 102A may be disposed proximal to a top of vehicle 100, for example, above doors to access the passenger compartment, whereas the second microphone 102B and the fifth microphone 102E may be disposed on longitudinal ends of the vehicle 100 (e.g., at leading and trailing ends of the vehicle 100). In some instances, the first microphone 102A, the second microphone 102B, and the fifth microphone 102E may be disposed on an exterior of the vehicle 100, or exterior to the passenger compartment. The third microphone 102C and/or the fourth microphone 102D may be disposed interior to vehicle 100, or within the passenger compartment.

However, although illustrated as including five microphones 102, the vehicle 100 may include more than or less than five microphones 102. For example, the microphones 102 illustrated in FIG. 1 may be disposed along a first lateral side of the vehicle 100, and the vehicle 100 may include additional microphones disposed along a second lateral side of the vehicle 100. Additionally, the locations of the microphones 102 on and/or within the vehicle 100 are for illustrative purposes, and it is contemplated that the microphones 102 may be disposed at different locations on the vehicle 100 other than the locations shown in FIG. 1, including in the interior and/or exterior of the vehicle 100. Further, the vehicle 100 may include additional sensors, such as inertial measurement units (IMUs), temperature sensors, image sensors (e.g., cameras), lidar sensors, radar sensors, time-of-flight (TOF) sensors, sonar sensors, pressure sensors, strain gauges, humidity sensors, geolocation sensors (e.g., GPS sensors), environmental sensors, piezoelectric sensors, accelerometers, air quality sensors, electrical voltage sensors, electrical current sensors, and the like, for permitting operation of the vehicle 100.

The microphones 102 may be used for a variety of purposes. For example, at least some of the microphones 102 may capture input from an occupant (e.g., passenger) of the vehicle 100 (e.g., verbal commands) to control or otherwise interact with the vehicle 100 (e.g., volume up, adjust temperature, etc.). In some examples, any or all of the microphones 102 may be used to capture such input. Additionally, the microphones 102 may be used to capture audio associated with an operation of components of the vehicle 100. In this way, in some examples, existing microphones may be leveraged to monitor an operation of the vehicle 100 or components of the vehicle 100.

In some examples, the microphones 102 may capture audio and generate audio data associated with one or more components and/or vehicle system(s) of the vehicle 100 (e.g., soundwaves emitted by the components). In some instances, the microphones 102 be used to determine directionality associated with the audio data. By way of example, if the microphones 102 include an array of microphones for capturing audio data produced by vehicle components, then the audio data captured by the array of microphones may be used to determine a location of the component that produced the audio data and/or to discriminate between different components to which the audio data may be attributable. For example, if a first microphone of the microphones 102 of the array is closer to the component than a second microphone of the microphones 102, then first audio data captured by the first microphone may include a stronger audio signal than second audio data captured by the second microphone, and so on. As such, based on the differing signal strength in the first audio data, the second audio data, third audio data, and so on, a direction and/or location of the component that produced the audio data may be determined. Additionally, the microphones 102 may be calibrated and/or analyzed to ensure that the audio data produced by the microphones is accurate and reliable.

Audio data captured by the microphones 102 may be used to generate audio signatures indicative of a performance of components of the vehicle 100 and/or vehicle systems of the vehicle 100. The components, in some instances, may include fans, pumps, brake calipers, motors, seals, and so forth, whereas the vehicle systems may include a HVAC system, a braking system, a drive system, and so forth. The audio signatures may be used to determine whether the components and/or the vehicle systems are operating properly. In this way, the microphones 102 may, in at least one example, capture audio data indicating whether or not the components are operating correctly. As part of this determination, the audio signatures associated with the components and/or the vehicle systems may be compared against reference audio signatures.

As illustrated in FIG. 1, the microphones 102 may be used to capture audio 104 associated with a component 106 of the vehicle 100, such as a pump. The audio 104 may be used to generate a first audio signature 108 and/or a second audio signature 110. In some instances, the first audio signature 108 may be generated by the microphones 102 of the vehicle 100, and/or may be generated by microphones of another vehicle and/or microphones of other devices (e.g., testing equipment). For example, as part of manufacturing a vehicle, the first audio signature 108 may be captured during while the component 106 is activated. The first audio signature 108 may therefore be representative of audio characteristics of the component 106. The first audio signature 108 may also be representative of a properly functioning component. In this sense, the first audio signature 108 may represent a reference, or baseline, audio signature to which subsequent audio signatures are compared. As such, the first audio signature 108 may be generated at a first instance in time.

As part of commissioning the vehicle 100, or before the vehicle 100 is commissioned for use, the vehicle 100 may undergo one or more EOL tests to ensure that the vehicle 100, or components thereof, are functioning properly. For example, at a second instance in time that is after the first instance in time in which the first audio signature 108 is generated, the microphones 102 may capture and generate audio data associated with a second audio signature 110. The vehicle 100 may include a monitoring component (or system) that compares the first audio signature 108 and the second audio signature 110 to determine whether the component 106 is functioning properly. Such determination may, additionally or alternatively, be made by one or more computing devices communicatively coupled to the vehicle 100.

If the first audio signature 108 and the second audio signature 110 are similar, or satisfy a threshold similarity, the component 106 may be determined to be functioning properly. In instances where the component 106 is determined to be functioning properly, the vehicle 100 may be commissioned for use. Additionally, or alternatively, other components and/or vehicle system(s) may be tested to ensure proper functioning. Here, the microphones 102 may capture additional second audio signatures 110 for comparison to respective first audio signatures 108 associated with other components and/or vehicle system(s). As such, the vehicle 100 may undergo a testing sequence in which components and/or vehicle system(s) are tested before the vehicle 100 is commissioned. For example, a first audio signature and a second audio signature associated with a braking system of the vehicle 100 may be compared to determine whether the braking system is squealing. Here, the components may be tested under known or commanded states for generating the second audio signatures 110 that are compared against the first audio signatures 108. This allows for the first audio signatures 108 and the second audio signatures 110 to be accurately compared in light of the known states.

Alternatively, if the first audio signature 108 and the second audio signature 110 are different, or do not satisfy the threshold similarly, the component 106 may be determined to not be functioning properly. For example, if the second audio signature 110 differs from the first audio signature by a threshold amount (e.g., a change in amplitude, frequency, and/or other characteristic) then this may indicate that the component 106 has failed, is damaged, or otherwise needs service. In such instances, the vehicle 100 may be decommissioned, or not put into use. Moreover, in some instances, other components and/or vehicle system(s) may be tested before decommissioning the vehicle 100. In such instances, the differences between the first audio signature 108 and the second audio signature 110 may be used to indicate which components are in need of servicing, repair, and/or replacement. That is, using the audio characteristics captured by the microphones 102, the components of the vehicle 100 in need of servicing, repair, and/or replacement may be determined. This may, in some instances, increase a repair time and downtime in which the vehicle 100 is being serviced.

While the above discussion is with regard to comparing the first audio signature 108 and the second audio signature 110 as part of EOL testing, the health of the vehicle 100 may be monitored using the microphones 102 and throughout a life span of the vehicle 100. For example, at scheduled intervals, the microphones 102 may captured audio data which is used to generate subsequent second audio signatures 110 that are compared against first audio signatures 108. Here, the first audio signatures 108 may be previously generated from components with similar wear and/or usage. As such, the first audio signature to which the second audio signature is compared may be dynamically determined based on the operational characteristics of the vehicle 100 and/or the components. As a brief example, the component 106 may be tested after the vehicle 100 has traveled 5,000 miles. In this example, a first audio signature associated with a properly function component at 5,000 miles may be compared against a second audio signature associated with the component 106, and as generated by audio captured by the microphones 102. Additionally, when the vehicle 100 is put back into service after maintenance, at periodic intervals (e.g., daily, weekly, monthly, etc.), after a predetermined period of operation (measured in terms of time or distance), upon the occurrence of an event (e.g., a collision, an adverse weather condition, a detected fault or error of a component, etc.), the first audio signatures 108 may be compared against the second audio signatures 110. Moreover, in some instances, the first audio signatures 108 may be compared against second audio signatures 110 in response to occupant complaints, during a charge of the vehicle 100, and so forth. For example, if an occupant of the vehicle 100 senses a disturbing noise, the occupant may issue a verbal command that causes the comparison of the first audio signatures 108 and the second audio signatures 110 to determine the vehicle health. Analysis of such may determine one or more corrective actions (e.g., schedule for service, operating conditions, and so forth).

As such, multiple first audio signatures 108 may be used for comparison against multiple second audio signatures 110 to ensure the proper functioning of the component 106.

In some instances, the first audio signature 108 and the second audio signature 110 may be associated with certain operating parameters of the vehicle 100. For example, the first audio signature 108 and the second audio signature 110 may be associated with a certain speed of the vehicle, whether other components of the vehicle 100 are operational, settings of the component 106 and so forth. Based on the current operating parameters of the vehicle 100, a respective first audio signature may be determined for comparison to a subsequently generated second audio signature. This may ensure the accuracy of determining components that are functioning properly and/or are not functioning properly.

Although the component 106 is illustrated at a particular location, or on a particular part of the vehicle 100, the vehicle 100 may include additional components that are located elsewhere. Additionally, it is to be understood that the vehicle 100 may include other components, such as a propulsion system, power supply system (including battery, fuel cell, combustion engine, or the like) and related electronics, steering system, braking system, suspension system, HVAC system, wheel and tire assemblies, and related controls and actuators for the forgoing systems. In some instances, each of the components, or components of the systems, may be associated with respective first audio signatures and second audio signatures for testing.

As noted above, in some instances, the microphones 102 may captured the audio 104 used for generating the second audio signatures 110 for use in comparison to the first audio signatures 108 to identify faulty or defective components. The microphones 102 may additionally, or alternatively, be used to determine sound perceived by the occupants within the vehicle 100. Such sounds may be generated by the component 106, or sounds transmitted into the passenger compartment (e.g., wind, road noise, etc.) In this sense, the microphones 102 may generate audio data indicative of sound experienced within the passenger compartment. If the sound is too loud, or above a threshold decibel level, components may be serviced or replaced. Moreover, the audio signature may indicate an egress of sound in a particular location, such as a particular door providing access to the passenger compartment. Here, such determination may indicate that one or more of door has failed, is damaged, or otherwise needs service. Such diagnosing may increase an experience of passengers within the vehicle 100. In some instances, each of the components and/or vehicle system(s) may have respective thresholds to which they are compared.

Although the above discussion is with regard to utilizing the first audio signature 108 and the second audio signature 110 for use in determining whether to commission or decommission vehicle 100, other actions may be performed based on comparing the first audio signature 108 and the second audio signature 110. For example, maintenance may be scheduled for the vehicle 100, the vehicle 100 (or another system) may perform a diagnostic test, doors of the vehicle 100 may be opened and closed, and so forth.

Figure 2:
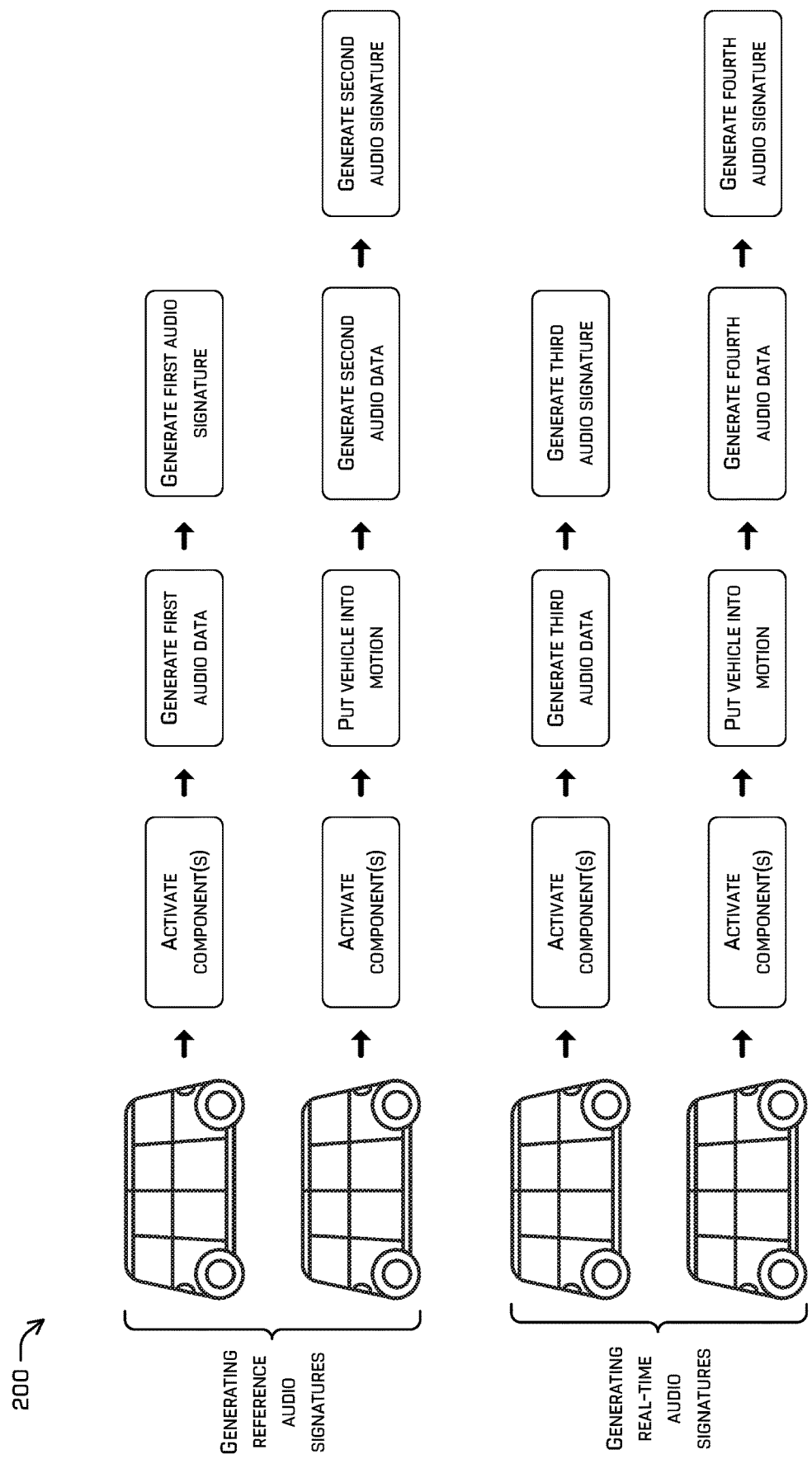
FIG. 2 illustrates an example scenario for determining audio signatures for monitoring a health of a vehicle, or components of the vehicle, according to an example of the present disclosure.

FIG. 2 illustrates an example scenario 200 for generating audio signatures for comparison to later generated audio signatures for use in determining whether components of the vehicle 100 are properly functioning. In some instances, multiple audio signatures may be generated for the components depending on the operating conditions of the vehicle 100. For example, in the scenario 200 of FIG. 2, audio signatures may be generated while the vehicle 100 is stationary, and while the vehicle 100 is in transmit. In the former instance, the vehicle 100 may be parked, and components of the vehicle 100 may be activated. In the latter instance, the vehicle 100 may travel around a track (e.g., test track).

As part of determining a reference audio signature while the vehicle 100 is parked, the component may be activated. For example, an air suspension compressor may be activated. In some instances, this may include activating the air suspension compressor to a particular setting (e.g., low, medium, high, etc.). Therein, microphones of the vehicle 100 (e.g., the microphones 102), or microphones of another device (e.g., testing device) may generate first audio data at a first instance in time. The first audio data, as discussed above, may be representative of the acoustic characteristics of the air suspension compressor. Moreover, the first audio data may be representative of sound perceived by occupants within the passenger compartment. In some instances, the first audio data may be captured over a particular period of time. Using the first audio data, a first audio signature may be generated. To generate the first audio signature, background noises (or noises from other components) may be filtered to isolate sound of the air suspension compressor. The first audio signature may then be stored for use at a later instance for comparison with audio signatures generated in real-time. The first audio signature is representative of a reference audio signature associated within a properly functioning air suspension compressor. Such determination may be made by a human technician or trained machine learning model with trained human labels (e.g., by generating audio using purposely railed or known failed components).

As part of determining a reference audio signature while the vehicle 100 is in motion, the component may be activated. For example, the air suspension compressor may be activated. In some instances, this may include activating the air suspension compressor to a particular setting (e.g., low, medium, high, etc.). Therein, microphones of the vehicle 100 (e.g., the microphones 102), or microphones of another device (e.g., testing device) may generate second audio data at a second instance in time. The second audio data represents the acoustic characteristics of the air suspension compressor while the vehicle is in transmit. Moreover, the second audio data may represent sound perceived by the occupants within the passenger compartment. Using the second audio data, a second audio signature may be generated. To generate the second audio signature, background noises (or noises from other components) may be filtered to isolate sound of the air suspension compressor while the vehicle 100 is in transmit. The second audio signature may then be stored for use at a later instance for comparison with other audio signatures generated in real-time. The second audio signature is representative of a reference audio signature associated within a properly functioning air suspension compressor or sounds perceived by occupants while the air suspension compressor is operational and while the vehicle is in transmit.

As such, the first audio signature and the second audio signature may serve as baselines audio signatures to which subsequently generated audio signatures are compared. For example, during an EOL test, the first audio signature and the second audio signature may be compared against real-time audio signatures generated by microphones of the vehicle 100 while the vehicle 100 is parked and in transmit, respectively.

As part of generating the real-time audio signatures, the component may be activated while the vehicle 100 is parked. For example, for a vehicle being manufactured, the air suspension compressor may be activated as part of an EOL test. In some instances, this may include activating the air suspension compressor to a particular setting (e.g., low, medium, high, etc.) according to the first audio signatures being compared. Therein, microphones of the vehicle 100 may generate third audio data at a third instance in time, where the third audio data is representative of the acoustic characteristics of the air suspension compressor. The third instance in time is subsequent to the first instance in time. In some instances, the third audio data may be representative of sound perceived by occupants within the passenger compartment. In some instances, the third audio data may be captured over a particular period of time that is equal to, or substantially equal to the period of time over which the first audio data was captured. Using the third audio data, a third audio signature may be generated. To generate the third audio signature, background noises (or noises from other components) may be filtered to isolate sound of the air suspension compressor. Therein, the third audio signature may be compared against the first audio signature to identify similarities or differences therebetween. If similar, or more than a threshold similarity, the air suspension controller may be properly functioning.

After comparing the first audio signature and the third audio signature, the component may then be tested while the vehicle 100 is in motion. For example, the air suspension compressor may be activated and subsequently, the vehicle 100 may be put into motion. Therein, microphones of the vehicle 100 may generate fourth audio data at a fourth instance in time that is subsequent to the second instance in time. The fourth audio data is representative of the acoustic characteristics of the component while the vehicle is in transmit and/or may be representative of sound perceived by the occupants within the passenger compartment. Using the fourth audio data, a fourth audio signature may be generated. To generate the fourth audio signature, background noises (or noises from other components) may be filtered to isolate sound of the air suspension compressor. Therein, the fourth audio signature may be compared against the second audio signature to identify similarities or differences therebetween. If similar, or more than a threshold similarity, the air suspension controller may be properly functioning.

Although the scenario 200 describes generating different reference audio signatures, one while the vehicle 100 is parked and one while the vehicle 100 is in motion, other reference audio signatures may be generated under different operating condition. For example, rather than generating reference audio signatures while the vehicle 100 is parked and in transmit, reference audio signatures may be generated for the air suspension compressor under different ambient temperatures (e.g., 0 degrees, 100 degrees, etc.), environmental conditions (e.g., rain, snow, etc.), and so forth. Each of the different operating conditions may have impact the audio characteristics captured by the microphones, or as generated by the air suspension compressor, for example. Such references may therein be used to ensure a proper comparison and testing to ensure the functioning of the components.

Figure 3:
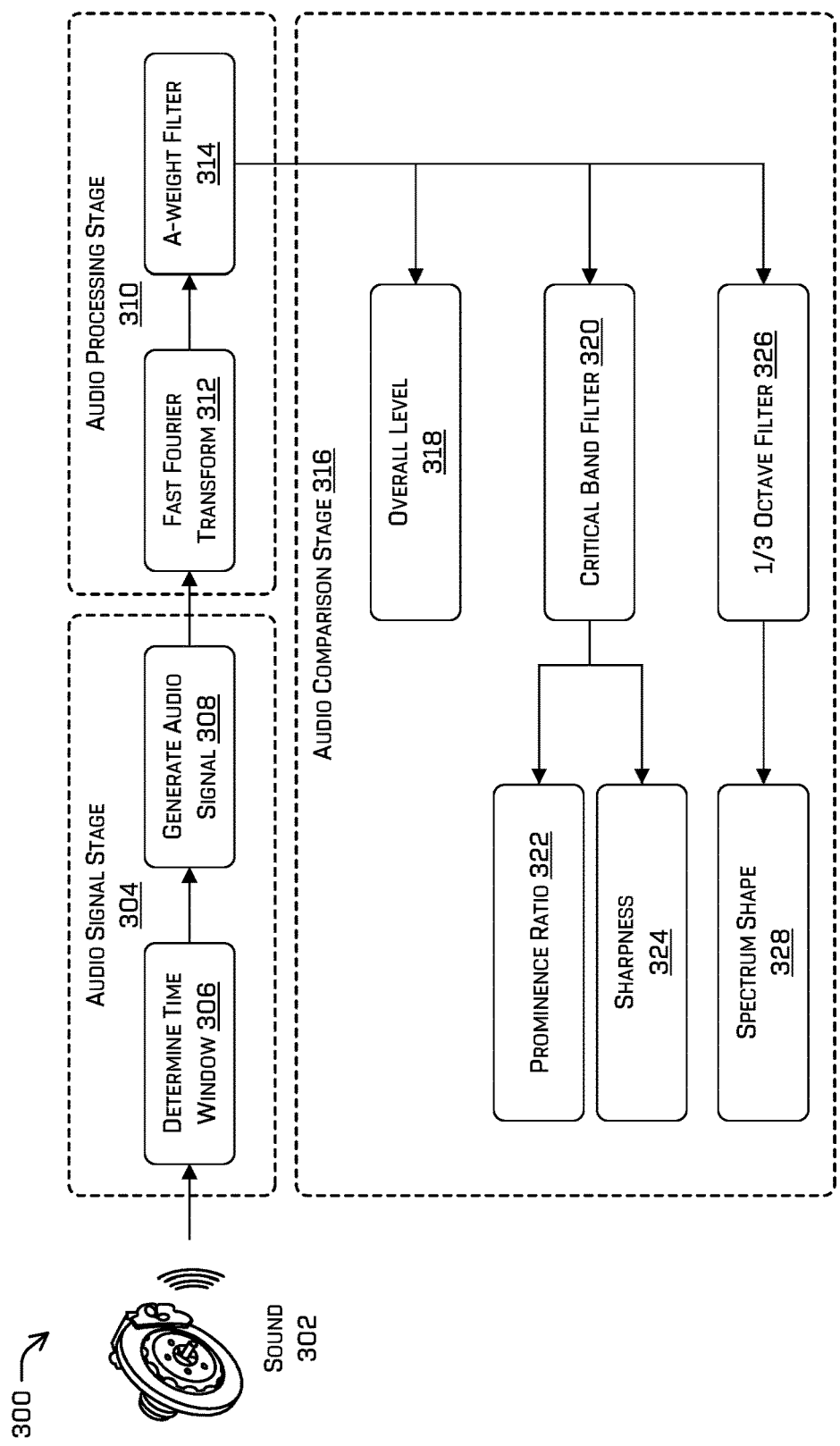
FIG. 3 illustrates an example scenario for processing audio data for use in monitoring a health of a vehicle, or components of the vehicle, according to an example of the present disclosure.

FIG. 3 illustrates an example scenario 300 associated with processing audio data for use in determining a health of a vehicle component or sounds perceived by occupants of the vehicle. The component shown in the scenario 300 represents a braking system. The braking system is shown outputting sound 302 in operation. In some instances, the braking system may be actuated as part of testing the braking system to ensure that the braking system is functioning properly. In some instances, this may be part of a test sequence associated with an EOL test, or during regularly scheduled intervals for testing the component.

The scenario 300 includes an audio signal stage 304 in which an audio signal associated with the sound 302 is generated. Initially, to capture the sound 302, a time window may be determined at 306. For example, depending on the component being tested, or the component producing the sound 302, a respective time window for capturing audio data associated with the sound 302 may be determined. This may ensure that a representative audio sample of the component is determined based on a wavelength, frequency, and/or other audio characteristics of the sound 302. In some instances, the time window may range from milliseconds (e.g., one millisecond, five milliseconds, etc.) to seconds (e.g., one second, two seconds, etc.). Also during the audio signal stage 304, and through the time window, an audio signal may be generated at 308. In some instances, the audio signal may be generated by microphones of the vehicle (e.g., within an interior and/or passenger compartment of the vehicle).

After generating the audio signal, the audio signal may be processed during an audio processing stage 310. In some instances, the audio processing stage 310 may involve filtering out background noise or processing the audio signal for use in analyzing sounds perceived by the human ear. For example, the processing may involve applying a fast Fourier transform at 312 to convert the audio signal into frequency domains. This may allow the audio signal to be analyzed under frequency domains that are audible to the human ear. Moreover, in some instances, an A-weight filter may be applied at 314 to the audio signal to measure sound levels perceived by the human ear. For example, as the human ear is less sensitive to low audio frequencies, the A-weight filter may filter out high-frequencies within the audio data for analyzing low frequencies perceived by the human ear.

After the audio processing stage 310, the audio signal may be analyzed in an audio comparison stage 316 for use in determining a health of the vehicle component and/or whether the sound is unpleasant to the human ear. In some instances, the comparison stage 316 may involve applying one or more filters to the audio signal, and/or comparing the audio signal to one or more references (or criteria). The audio comparison stage 316 may involve defining metrics by which to compare the audio signal. For example, an overall level 318 may be indicative a decibel level of the audio signal, whether an average decibel, a highest decibel, or a lowest decibel within the time window, and may be compared to a threshold level. In some instances, the threshold level may be particular to the component being tested, and/or operating parameters of the vehicle while the component is being tested (e.g., stationary, moving, etc.). For example, the threshold level may be 50 dBA while the vehicle is stationary but 55 dBA while the vehicle is moving. In some instances, the comparison of the decibel level may indicate whether the component is healthy and/or whether the sound 302 produced by the component is obnoxious or otherwise disturbing to occupants of the vehicle. That is, the threshold levels may be established based on tolerable levels of the occupants, or levels that provide a comfortable experience to occupants of the vehicle. As such, if components generate sound that is greater than the threshold, this may lead to unenjoyable experiences for the occupants and/or may be indicative of a faulty or defective component.

A critical band filter 320 may be applied to generate subjective data that is indicative of sounds that are commonly perceived by the human ear. For example, the critical band filter 320 may filter (e.g., using an octave filter) frequency bandwidths representative of an auditory filter created by the cochlea of the human ear. In applying the critical band filter 320, a prominence ratio and a sharpness may be determined at 322 and 324, respectively. The prominence ratio may be used to determine if there are prominent tones in the audio signal. As the prominence ratio is based on analyzing the critical bands, applying the critical band filter allows for the prominence ratio to be determined. After determining the prominence ratio, the prominence ratio may be compared against a threshold. For example, the threshold may be 3 dBA.

The sharpness corresponds to a hearing sensation related to frequency and is independent of a loudness of the sound 302. The sharpness may correspond to sharp, painful, high-frequency sound as perceived by the occupants and may represents the comparison of the amount of high frequency energy to the total energy and/or the audio signal. In some instances, the prominence ratio 322 and/or the sharpness 324 may relate to analyzing the psychoacoustics of the sound 302, or how humans perceive various sounds. In doing so, the sound 302 may be analyzed for use in determining whether the sound 302 is disruptive to the occupants in the vehicle. This may, additionally or alternatively, also be used to indicate whether the component generating the sound 302 is defective.

The audio comparison stage 316 may also involve applying a ⅓ octave filter 326 for use in determining a spectrum shape 328. The ⅓ octave filter 326 may be used to determine a detailed view of the frequency composition of the sound 302 in the audio signal. Applying the ⅓ octave filter 326 may be used to determine the spectrum shape of the audio signal across the frequency range. The spectrum shape 328, in some instances, may be compared against reference spectrum shape(s) for use in determining whether the sound 302 produced by the component is acceptable.

Although the audio comparison stage 316 illustrates the comparison of certain metrics of the audio signal, additional metrics may be determined and/or compared for use in determining the health of the vehicle component. For example, these metrics may include tone to noise ratios, spectrums and/or frequencies within an articulation index, modulation frequency, and/or loudness.

Figure 4:
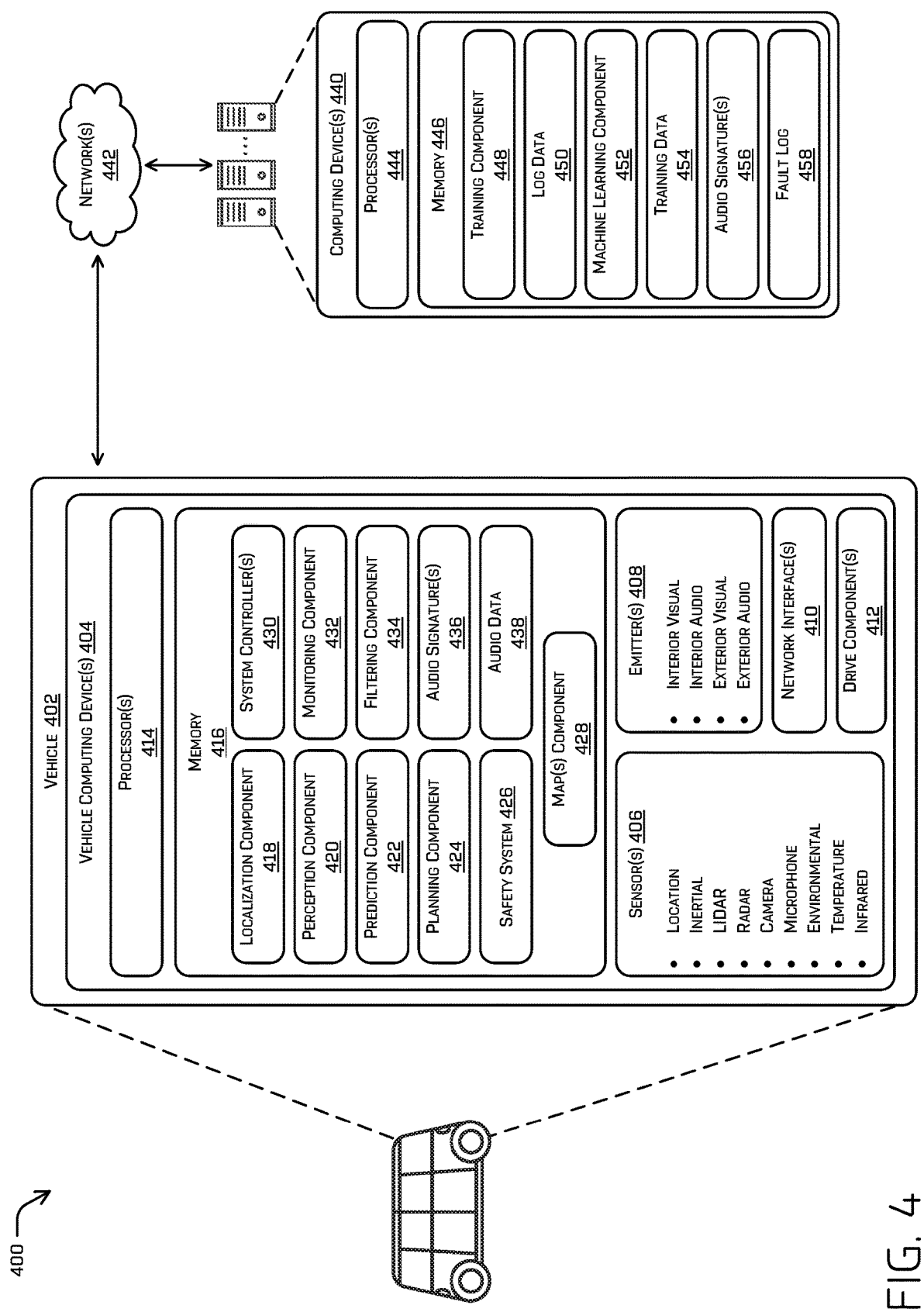
FIG. 4 illustrates a block diagram of an example system for implementing the techniques described herein, according to an example of the present disclosure.

FIG. 4 depicts a block diagram of an example architecture 400 for implementing the techniques discussed herein. In some instances, the example architecture 400 may include a vehicle 402, which may represent the vehicle 100 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include one or more vehicle computing device(s) 404, one or more sensor(s) 406, one or more emitter(s) 408, one or more network interface(s) 410 (also referred to as communication devices and/or modems), and/or one or more drive component(s) 412. In some instances, the one or more sensor(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402. Similarly, the microphone sensors may include multiple microphones disposed at various locations about the exterior and/or interior of the vehicle 402. The one or more sensor(s) 406 may provide input to the vehicle computing device(s) 404.

The one or more emitter(s) 408 may emit light and/or sound. The one or more emitter(s) 408 in this example may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more network interface(s) 410 that enable communication between the vehicle 402 and one or more other local or remote computing device(s) (e.g., a remote teleoperation computing device) or remote services. For instance, the one or more network interface(s) 410 may facilitate communication with other local computing device(s) on the vehicle 402. Also, the one or more network interface(s) 410 may allow the vehicle 402 to communicate with other nearby computing device(s) (e.g., other nearby vehicles, traffic signals, etc.). The one or more network interface(s) 410 may include physical and/or logical interfaces for connecting the vehicle computing device(s) 404 to another computing device or one or more external networks (e.g., the Internet). For example, the one or more network interface(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 402 may include one or more drive component(s) 412. In some examples, the vehicle 402 may have a single drive component 412. In at least one example, the vehicle 402 may have multiple drive components 412, where individual drive components 412 may be positioned on opposite ends of the vehicle 402 (e.g., the front and the rear, etc.). In at least one example, the drive component(s) 412 may include the one or more sensor(s) 406 to detect conditions of the drive component(s) 412 and/or the surroundings of the vehicle 402. By way of example and not limitation, the sensor(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive component(s) 412. In some cases, the sensor(s) 406 on the drive component(s) 412 may overlap or supplement corresponding systems of the vehicle 402 (e.g., sensor(s) 406).

The drive component(s) 412 may include many vehicle systems, including a high voltage battery, a motor to propel the vehicle 402, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, a HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Additionally, the drive component(s) 412 may include a drive manager component. In some instances, the drive manager component may receive and preprocess data from the sensor(s) 406 and to control operation of the various system(s) and/or component(s) of the vehicle 402. In some examples, the drive manager component may include one or more processor(s) and memory communicatively coupled with the one or more processor(s). The memory may store one or more components to perform various functionalities of the drive component(s) 412. Furthermore, the drive component(s) 412 also include one or more communication connection(s) that enable communication by the respective drive system with one or more other local or remote computing device(s).

As shown, the vehicle computing device(s) 404 may include one or more processor(s) 414 and memory 416 communicatively coupled with the one or more processor(s) 414. In the illustrated example, the memory 416 of the vehicle computing device(s) 404 stores a localization component 418, a perception component 420, a prediction component 422, a planning component 424, a safety system 426, a map(s) component 428, one or more system controller(s) 430, a monitoring component 432, a filtering component 434, one or more audio signatures 436 associated with one or more components of the vehicle 402, and/or audio data 438. Though depicted as residing in the memory 416 for illustrative purposes, it is contemplated that the localization component 418, the perception component 420, the prediction component 422, the planning component 424, the safety system 426, the map(s) component 428, the one or more system controller(s) 430, the monitoring component 432, the filtering component 434, the audio signatures 436, and/or the audio data 438 may additionally, or alternatively, be accessible to the vehicle computing device(s) 404 (e.g., stored in a different component of vehicle 402) and/or be accessible to the vehicle 402 (e.g., stored remotely)

In the memory 416 of the vehicle computing device(s) 404, the localization component 418 may include functionality to receive data from the sensor(s) 406 to determine a position of the vehicle 402. For example, the localization component 418 may include and/or request/receive a three-dimensional map of an environment and may continuously determine a location of the vehicle 402 within the map. In some instances, the localization component 418 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the vehicle 402. In some instances, the localization component 418 may provide data to various components of the vehicle 402 to determine an initial position of vehicle 402 for generating a trajectory, as discussed herein The perception component 420 may include functionality to perform object detection, segmentation, and/or classification. In some examples, the perception component 420 may provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In some instances, the perception component 420 may include functionality to store perception data generated by the perception component 420. In some instances, the perception component 420 may determine a track corresponding to an object that has been classified as an object type. The stored perception data may, in some examples, include fused perception data captured by the vehicle 402. Fused perception data may include a fusion or other combination of sensor data from the sensor(s) 406, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.)

In additional and/or alternative examples, the perception component 420 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 420 may use perception algorithms to determine a perception based bounding box associated with an object in the environment based on sensor data. For example, the perception component 420 may receive image data from the one or more sensor(s) 406 and classify the image data to determine that an object is represented in the image data. Then, using detection algorithms, the perception component 420 may generate a two dimensional bounding box and/or a perception based three dimensional bounding box associated with the object. The perception component 420 may further generate a three dimensional bounding box associated with the object. The three dimensional bounding box may provide additional information such as a location, orientation, pose, and/or size (e.g., size, width, height, etc.) associated with the object.

The prediction component 422 may generate one or more probability maps representing prediction probabilities of possible locations of one or more objects in an environment. For example, the prediction component 422 may generate one or more probability maps for vehicles, pedestrians, animals, and the like within a threshold distance from the vehicle 402. In some instances, the prediction component 422 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 424 may determine a path for the vehicle 402 to follow to traverse through an environment. For example, the planning component 424 may determine various routes and paths and various levels of detail. In some instances, the planning component 424 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle In other examples, the planning component 424 may alternatively, or additionally, use data from the perception component 420 and/or the prediction component 422 to determine a path for the vehicle 402 to follow to traverse through an environment. For example, the planning component 424 may receive data from the perception component 420 and/or the prediction component 422 regarding objects associated with an environment. Using this data, the planning component 424 may determine a route to travel from a first location (e.g., a current location) to a second location (e.g., a target location) to avoid objects in an environment. In at least some examples, such a planning component 424 may determine there is no such collision free path and, in turn, provide a path which brings vehicle 402 to a safe stop avoiding all collisions and/or otherwise mitigating damage.

In some examples, the planning component 424 may generate instructions to control the vehicle 402 to perform one or more operations during a test mode during which the audio signatures 436 are generated for one or more components of the vehicle 402. For instance, the planning component 424 may guide the vehicle 402 to travel at a constant speed for a period of time while the component(s) are activated so that the audio signatures 436 for the component may be captured while the vehicle 402 is traveling at the constant speed.

In examples, the safety system 426 in addition to or in place of the planning component 424 may alternatively, or additionally, use data from the perception component 420, the one or more sensor(s) 406, and/or the localization component 418, to determine whether a path for the vehicle 402 through an environment will require a sudden change in velocity, a hard stop, or if a collision is unavoidable. For example, safety system 426 may receive data from the perception component 420, the one or more sensor(s) 406, and/or the localization component 418, regarding objects associated with an environment. Using this data, the safety system 426 may determine a required change in velocity of the vehicle, a predicted change in velocity of the vehicle, a collision, or a predicted collision.

In examples, the planning component 424 and/or the safety system 426 may determine an impact location between the vehicle 402 and the object based at least in part on trajectories of the vehicle 402 and/or the object. For example, planning component 424 and/or safety system 426 may determine that the intersection between the vehicle 402 and the object is on a side, front, rear, etc. of the vehicle 402. In some instances, planning component 424 and/or safety system 426 may determine whether the vehicle 402 includes rearward facing occupant(s) and/or forward facing occupant(s) within the vehicle 402, using the trajectory of the vehicle 402 and/or the sensor(s) 406.

In some instances, the planning component 424 and/or the safety system 426 may be configured to determine a time associated with change in velocity of the vehicle 402, a predicted change in velocity of the vehicle 402, a collision, or a predicted collision, or whether the change in velocity of the vehicle 402, a predicted change in velocity of the vehicle 402, a collision, or a predicted collision is imminent. The time may be a particular time, such as, for example, 120 milliseconds after 3:05 pm, or it may be a time interval from a time in which change in velocity of the vehicle 402, a predicted change in velocity of the vehicle 402, a collision, or a predicted collision was determined. The time may be determined based on a measured closure rate of the object toward the vehicle 402, a velocity of the vehicle 402, an acceleration of the vehicle 402, a velocity of the object, an acceleration of the object, road conditions, weather conditions, and/or other factors that may affect a closure rate of the object toward the vehicle 402, or vice versa.

The memory 416 may further include one or more map(s) component 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map(s) component 428 may include at least one map (e.g., images and/or a mesh). In some examples, the vehicle 402 may be controlled based at least in part on the map(s) component 428. That is, the map(s) component 428 may be used in connection with the localization component 418, the perception component 420 (and subcomponents), the prediction component 422, and/or the planning component 424 to determine a location of the vehicle 402, identify objects in an environment, generate prediction probability(ies) associated with objects and/or the vehicle 402, and/or generate routes and/or trajectories to navigate within an environment.

In at least one example, the vehicle computing device(s) 404 may include one or more system controller(s) 430, which may be configured to control steering, propulsion, braking, safety, emitters, communication, and other systems of the vehicle 402. These system controller(s) 430 may communicate with and/or control corresponding systems of the drive component(s) 412 and/or other components of the vehicle 402, which may be configured to operate in accordance with a path provided from the planning component 424. For example, in some examples, the vehicle 402 may control operation of one or more components in order to monitor their condition using one or more sensor(s) 406 and to generate the audio signatures 436 associated with the component(s). In some examples, the vehicle computing device(s) 404 may implement a "test mode" when the vehicle 402 is first commissioned or when a new component is put into service. The vehicle 402 may perform one or more operations associated with causing a component to activate under one or more conditions so that the audio data 438 associated with the component may be captured by the sensor(s) 406 (e.g., microphones). For example, in the case of a fan of a HVAC system, the system controller(s) 430 may control the fan to run through all of its available settings (e.g., high, medium, low, etc.) while the planning component 424 instructs one or more other system controllers 430 to control the vehicle 402 to traverse an environment at different rates of speed, with one or more doors or windows open and closed, etc. in order to isolate the audio signature 436 associated with the component under various operating conditions. The audio signature 436 may then be compared to reference audio signature in order to determine whether the component is functioning properly.

The monitoring component 432 is configured to monitor the vehicle 402 as a whole and/or individual components or systems of the vehicle 402. The monitoring component 432 receives the audio data 438 from the sensor(s) 406, and uses the audio data 438 to determine the audio signatures 436 of the components to determine components of the vehicle 402 that may be faulty or in need of servicing. The monitoring component 432 may monitor the condition of virtually any component of the vehicle 402, such as propulsion systems (e.g., motors, gear boxes, drive train, etc.), energy storage systems (e.g., batteries, fuel cells, combustion engines, etc.), braking systems, steering systems, door seals, HVAC systems, cooling systems, computing systems, etc. In some instances, the monitoring component 432 may be configured to determine an operating status of the components based on the comparison of the audio signatures 436. For example, the monitoring component 432 may receive the audio data 438 captured by microphone(s) of the sensor(s) 406 and determine whether the component is functioning properly by comparing the audio signature 436 of a properly functioning component (e.g., reference audio signature) with the audio signature 436 of a component currently under test. In some instances, the monitoring component 432 made determine the status of the component based on a single audio data recording or multiple audio data recordings.

The filtering component 434 may filter and/or process the audio data 438 captured by the sensor(s) 406. As an example, the filtering component 434 may process the audio data 438 to remove background noise associated with the audio data 438. For instance, if the audio data 438 comprises an audio signature associated with a component of the vehicle 402 and background noise, the filtering component 434 may identify the audio signature associated with the component to filter out at least some of the background noise. Additionally, or alternatively, the filtering component 434 may identify the background noise of the audio data 438 with respect to the audio signature of the component and remove at least some of the background noise from the audio data 438. Further filtering may include A-weight filters, octave band filtering, and so forth.

The audio signatures 436 are associated with components of the vehicle 402. Additionally, or alternatively, the audio signatures 436 may be associated with components of other vehicles different than the vehicle 402. For example, the audio signatures 436 may include one or more audio signatures associated with a specific component of a vehicle (e.g., brake system, HVAC system, etc.). In some examples, the audio signatures 436 may include one or more baseline audio signatures associated with components of the vehicle 402, and may additionally, or alternatively, include one or more progressive sensor signatures (e.g., an audio signature that is updated throughout the respective lifespan of the component) associated with components of the vehicle 402. In this way, the audio signatures 436 may be used to determine operating statuses associated with components of the vehicle 402 (e.g., whether the component is functioning properly).

The memory 416 may also store the audio data 438 captured by the sensor(s) 406 of the vehicle 402. The audio data 438 may include raw sensor data (e.g., the audio data 438 that is captured by a microphone of the vehicle 402) and/or processed audio data (e.g., audio data that is processed by the filtering component 434 after being captured by a microphone). The audio data 438 may be used to determine one or more of the audio signatures 436 described above. Additionally, or alternatively, the audio data 438 may be used to determine operating statuses associated with components of the vehicle 402.

In some instances, aspects of some or all of the memory-stored components discussed herein may include any models, algorithms, and/or machine learning algorithms. For example, in some instances, components in the memory 416 such as the localization component 418, the perception component 420, the prediction component 422, the planning component 424, the monitoring component 432, and the filtering component 434 may be implemented as a neural network. For instance, the monitoring component 432 may comprise a machine learned model (e.g., neural network) which has been trained to predict operating statuses of one or more components of the vehicle 402 based on the comparison of the audio signatures.

The vehicle 402 may connect to computing device(s) 440 via a network(s) 442 and may include one or more processor(s) 444 and memory 446 communicatively coupled with the one or more processor(s) 444. In at least one instance, the one or more processor(s) 444 may be similar to the processor(s) 414, and the memory 446 may be similar to the memory 416. The memory 446 may store a training component 448, log data 450, a machine learning component 452, training data 454, training data 454, one or more audio signatures 456 that are associated with vehicle components, such as components of vehicle 402, and/or a fault log 458.

The log data 450 may include historical and/or pre-recorded audio data obtained from a computing system of the vehicle 402 (and/or other vehicles, etc.), which captured and stored the audio data during operation. The log data 450 may include raw audio data and/or processed audio data. The training component 448 may generate the training data 454 using the log data 450. For instance, the training component 448 may label audio data associated with vehicle components with one or more measured parameters and/or characteristics of the vehicle components associated with the audio data 438. The audio data 438 and/or the measured parameters or characteristics may be obtained from the log data 450, the audio signatures 456, and/or the fault log 458. The label may include an indication of an operating status (e.g., normal, failed, time-to-failure, etc.) associated with the vehicle component (e.g., brake system, HVAC system, door/window seal, etc.) and/or any other characteristics of the vehicle component at the time the audio data was captured and/or at one or more times subsequent to the time the audio data was captured. The training component 448 may then use the training data 454 to train the machine learning component 452 to predict operating statuses associated with vehicle components based at least in part on receiving, as an input, the audio data 438 and/or the audio signatures 456 (or the audio signatures 436).

The memory 446 of the computing device(s) 440 may additionally store the audio signatures 456 associated with components of vehicles, such as components of the vehicle 402 and/or another vehicle. In some instances, the audio signatures 456 may include one or more reference audio signatures associated with components of one or more vehicles, and may additionally, or alternatively, include one or more subsequent or progressive audio signatures associated with the components. In that case, the subsequent audio signatures may be compared to the reference signatures to determine an operating status of the respective components. In this way, the audio signatures 456 may be used to determine operating statuses associated with components of the vehicle 402, or other vehicles. In some examples, the audio signatures 456 may be sent to the vehicle computing device(s) 404 via the network(s) 442. Additionally, the audio signature 436 may be sent to the computing device(s) 440.

The audio data 438 may be sent to the computing device(s) 440 via the network(s) 442 to be used as the log data 450 and/or training data 454. For example, the vehicle 402 may send audio data 438 to one or more computing device(s) 440 via the network(s) 442. In some examples, the vehicle 402 can send raw audio data to the computing device(s) 440. In other examples, the vehicle 402 can send processed audio data and/or representations of the audio data to the computing device(s) 440. In some examples, the vehicle 402 can send audio data to the computing device(s) 440 at a particular frequency, after a lapse of a predetermined period of time, in near real-time, etc. In some cases, the vehicle 402 may send audio data 438 (raw or processed) to the computing device(s) 440 as one or more log files.

In some examples, the memory 446 may include the fault log 458 indicating failures associated with one or more vehicles, such as the vehicle 402 and/or components of the vehicle 402, and may be recorded in the fault log 458. The fault log 458 may include an indication of the failure measurement detected and an identifier of the component(s)/system(s) involved (e.g., an audio signature associated with a failed operating status of a vehicle component). The fault log 458 may also store a snapshot of operating conditions leading up to the failure (e.g., a series of progressive audio signatures over at least a portion of the lifespan of the vehicle component). Although depicted in FIG. 4 as residing in memory of the computing device(s) 440, in at least some examples, the fault log 458 may be stored locally at the vehicle 402. In some examples, the fault log 458 may be used to label the log data 450 for use in training a machine learned model of the machine learning component 452 and/or the monitoring component 432 to predict an operating status of components. Additionally, in at least some examples, the fault log 458 may be reported by the vehicle 402 to the computing device(s) 440. This reporting may occur periodically (e.g., daily, hourly, etc.) or upon the occurrence of certain events (e.g., detection of a collision, transit to a service location, detection of a change in operating status of a component, change in a sensor signature associated with a component, etc.).

The processor(s) 414 of the vehicle computing device(s) 404 and/or the processor(s) 444 of the computing device(s) 440 may be any suitable processor capable of executing instructions to process data and perform operations as described herein. By way of example and not limitation, the processor(s) 414 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 416 of the vehicle computing device(s) 404 and/or the memory 446 of the computing device(s) 440 are examples of non-transitory computer-readable media. The memory 416 and 446 may store an operating system and one or more software applications, instructions, programs, and/or data to implement the methods described herein and the functions attributed to the various systems. In various implementations, the memory 416 and 446 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 416 and 446 may be implemented as a neural network.

As described herein, an exemplary neural network is an algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

FIGS. 5-8 illustrate various processes related determining a health of a vehicle using sound. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

Figure 5:
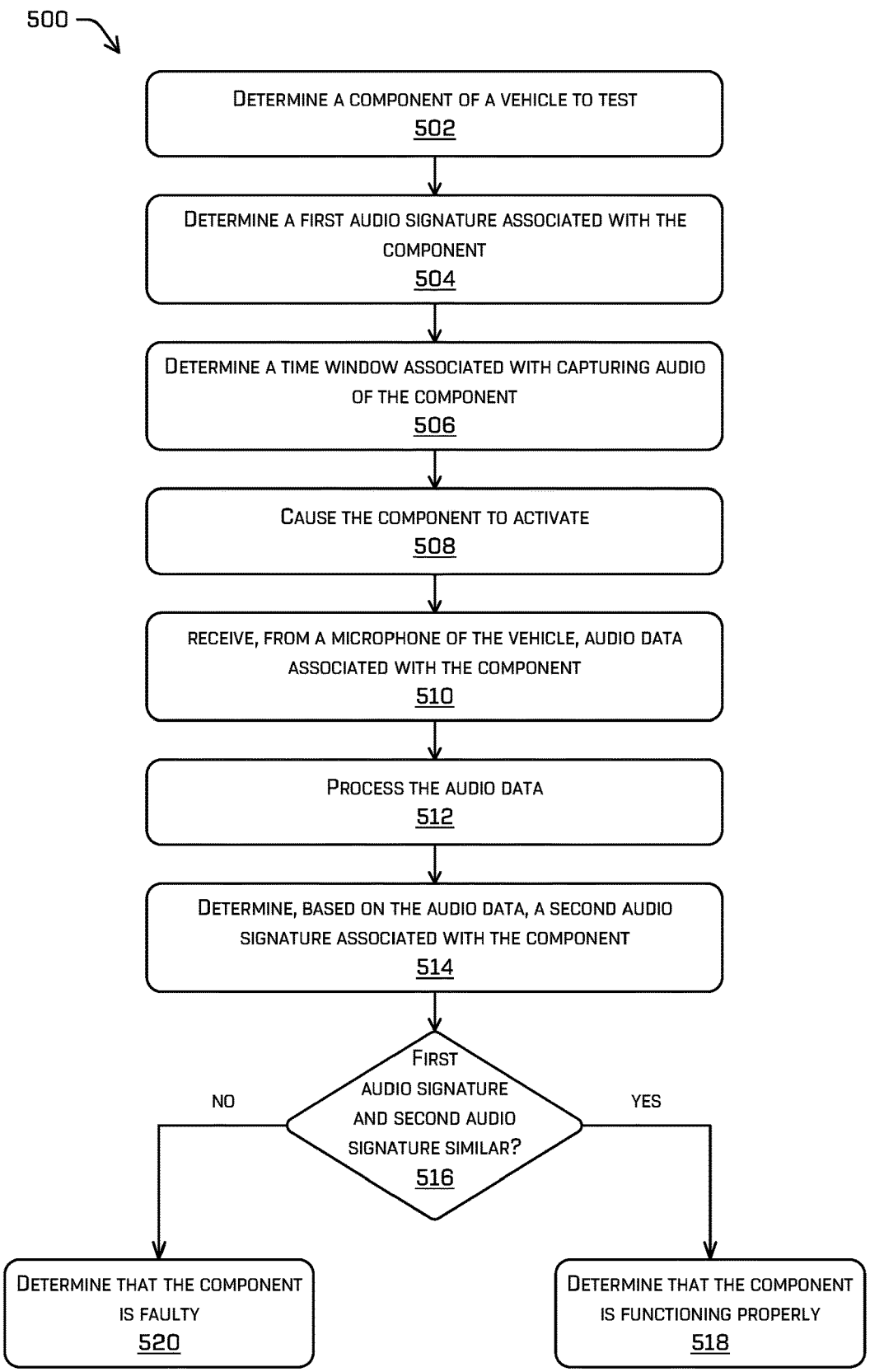
FIG. 5 illustrates an example process for monitoring a health of a vehicle, or components of the vehicle, according to an example of the present disclosure.

FIG. 5 illustrates an example process 500 for determining a vehicle health and/or a vehicle component health. At 502, the process 500 may include determining a component of a vehicle to test. In some instances, the testing may involve an EOL test after a vehicle is manufactured and before the vehicle is commissioned for use. In some instances, testing the component may be carried out during a testing sequence in which multiple components of the vehicle are tested. That is, the components of the vehicle may be tested to ensure that the components are operating properly and/or within certain thresholds. However, as part of this, the process 500 may determine a current component under test (e.g., AC compressor, cooling pump, fan, air suspension compressor, computing hardware, brakes, motor, seals, etc.)

At 504, the process 500 may include determining a first audio signature associated with the component. In some instances, the first audio signature may represent a reference audio signature that was captured by microphones of another vehicle that included the component. Here, the component of the other vehicle may be functioning properly, and as such, the audio signature associated with that component may be utilized as the first audio signature to ensure the proper functioning of future components (e.g., the component currently under test). The first audio signature may additionally, or alternatively, be captured by technicians utilizing testing instruments as part of a test mode of the vehicle by activating the component of the vehicle and capturing audio data associated with the component.

At 506, the process 500 may include determining a time window associated with capturing audio of the component. In some instances, the time window may be based at least in part on the component under test. The time window may represent a period of time in which the component is activated, between an on state and an off state. The time window may be of sufficient length to ensure that sufficient audio of the component is captured. Additionally, the components may produce audio at/with certain frequencies and/or wavelengths, and the determined window of time may be such that an accurate sample of the audio data is captured.

At 508, the process 500 may include causing the component to activate. By way of example, if the vehicle component that is to be activated includes the HVAC system, then the vehicle may cause various HVAC system components to turn on or off, such as an AC compressor, ventilation fan, etc. The amount of time the component is activated may be dependent on the time window over which the audio of the component is captured. In some instances, the other systems or components of the vehicle may be deactivated while activating the vehicle component in order to isolate a portion of audio data attributable to the component being activated. Additionally, in some examples, multiple components may be activated in combination to identify interactions or relationships between various components.

At 510, the process 500 may include receiving, from a microphone of the vehicle, audio data associated with the component. The microphones may be located within an interior or on an exterior of the vehicle. In some instances, the audio data may be received during the time window associated with capturing the audio of the component. In some instances, if the vehicle is activating the component, then the vehicle computing device may be aware that the audio data is associated with the component.

At 512, the process 500 may include processing the audio data. For example, the audio data captured at 510 may include raw audio data. As such, the audio data may be processed to generate processed audio data. In some instances, the processed audio data may include removing and/or reducing portions of data (e.g., background noise) from the audio data and/or isolating portions of audio data associated with the component being tested. For example, in some instances, other components of the vehicle may be tested concurrently, and the audio associated with other components may be removed to isolate the audio of the component of interest.

At 514, the process 500 may include determining, based at least in part on the audio data, a second audio signature associated with the component. The second audio signature may be used to compare against the first audio signature, determined at 504, for use in determining whether the component is functioning properly. Noted above, the second audio signature may be representative of audio of the component during an EOL test and prior to the vehicle being commissioned.

At 516, the process 500 may include determining whether the first audio signature and the second audio signature are similar. In some instances, determining whether the first audio signature and the second audio signature are similar may involve comparing the first audio signature and the second audio signature to determine whether the first audio signature and the second audio signature have a threshold similarity. To compare the first audio signature and the second audio signature, frequencies, magnitudes, tonalities, visual appearances of a wave form, etc. of the first audio signature and the second audio signature may be compared. If at 516, the first audio signature and the second audio signature are similar, or satisfy a threshold similarity, the process may follow the "YES" route and proceed to 518.

At 518, the process 500 may include determining that the component is functioning properly. For example, by comparing the second audio signature with the first audio signature, which is representative of a properly functioning component, the process 500 may determine that the component is not defective. In some instances, at 518 the process 500 may determine a condition of the component (e.g., operational, functional, etc.). From 518, the process 500 may proceed to test other components of the vehicle, and/or may commission the vehicle for use. Additionally, or alternatively, the process 500 may test the component under different operating conditions (e.g., while the vehicle is in transmit). Here, the microphones may capture audio data for use in generating the audio signature for comparison to reference audio signatures. In some instances, as a result of determining that the component is functioning properly, the vehicle may be commissioned for use.

Alternatively, if at 516 the process 500 determines that the first audio signature and the second audio signature are not similar, or do not include a threshold similarity, the process 500 may follow the "NO" route and proceed to 520. At 520, the process 500 may include determining that the component is faulty and/or is otherwise not functioning properly. For example, by comparing the second audio signature with the first audio signature, which is representative of a properly functioning component, the process 500 may determine that the component is defective where the second audio signature is not similar to the first audio signature. In some instances, at 520 the process 500 may determine a condition of the component (e.g., non-operational, non-functional, etc.). From 520, the process 500 may proceed to test other components of the vehicle and/or may service the definitive component. In some instances, as a result of determining that the component is faulty, the vehicle may be decommissioned, the vehicle may be schedule for service, a diagnostic test may be performed on the vehicle, and so forth.

Although the process 500 is discussed with regard to testing a component as part of EOL test, the component may be tested during regularly-scheduled intervals, before the vehicle is used, and so forth. In this instances, other first audio signatures, representative of the healthy component at particular intervals may be used. For example, a first audio signature of a healthy component at 5,000 miles may be used for comparison to second audio signatures of other components at 5,000 miles. As such, the components of the vehicle may be tested throughout the lifespan of the vehicle, or the component.

Figure 6:
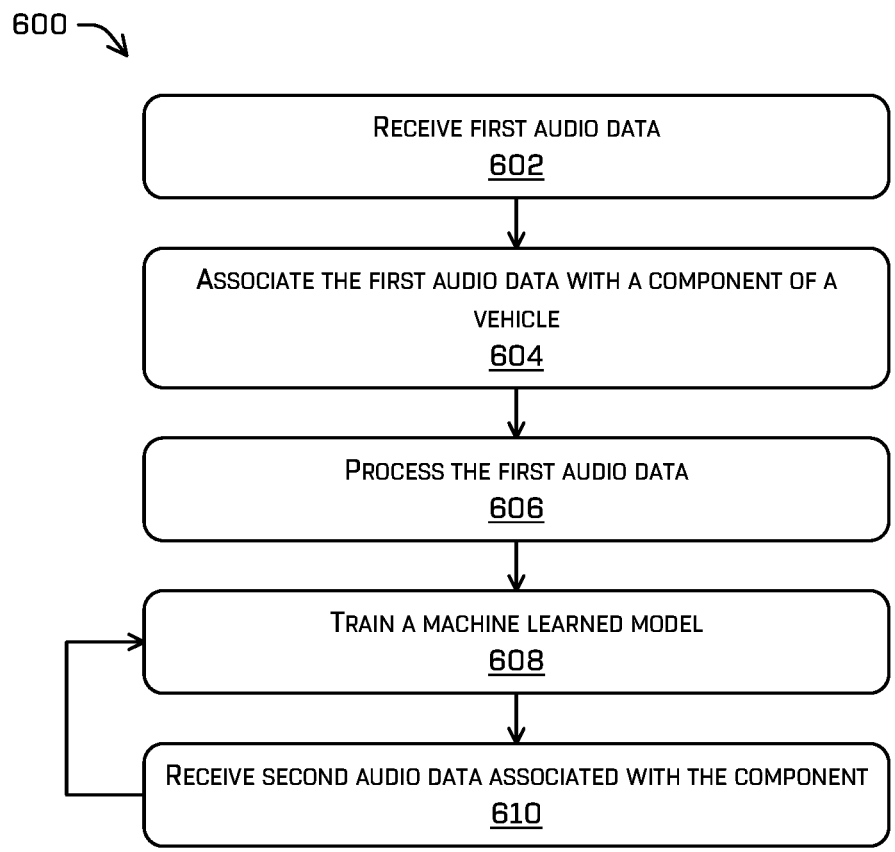
FIG. 6 illustrates an example process for training a machine learned model for use in monitoring a health of a vehicle, or components of the vehicle, according to an example of the present disclosure.

FIG. 6 illustrates an example process 600 for training a machine-learned model for use in determining vehicle health.

At 602, the process 600 may include receiving audio data indicative of an operating status associated with a component of a vehicle. In some instances, the audio data may be captured during a test mode of a vehicle by activating the component of the vehicle and capturing audio data associated with the component. In some instances, the audio data may be captured by microphones of the vehicle, or via test equipment used by technicians. For example, the audio data may be captured for use in training a machine-learning model to identify components that are worn, defective, properly functioning, etc.

At 604, the process 600 may include associating the first audio data with a component of a vehicle. For example, the process 600 may determine a component of the vehicle, such as a brake system, HVAC system, etc. that produced sound represented within the audio data. In some instances, the process 600 may determine which component is associated with the audio data through knowing which component(s) of the vehicle are activated.

At 606, the process 600 may include processing the first audio data. For example, in some instances, the first audio data may comprise raw audio data. As such, the first audio data may be processed to generate processed audio data. In some instances, processing the first audio data may include removing background noise and/or isolating portions of the first audio data attributable to the component of interest. Moreover, processing the first audio data may include applying FFTs, filters (e.g., critical band filter, ⅓ Octave Band filter, A-weight filter, etc.). In some instances, the filters applied to the first audio data may process the first audio data to analyze the psychoacoustic properties of the first audio data.

At 608, the process 600 may include training a machine learned model. In some instances, the machine learned model may comprise and/or utilize a penalized linear regression model, a linear regression model, decision tree, logistic regression model, a support vector machine (SVM), a Naive Bayes model, a k-nearest neighbors (KNN) model, a k-Means model, a neural network, or other logic, model, or algorithm alone or in combination. In some instances, the machine learned model may be trained via labels applied by a human labeler. For example, a human labeler may analyze the first audio data to detect sounds, or portions of the first audio data, that are indicative of faults of the component (e.g., energy level) and/or components that are not properly functioning. In other words, a health of the component may be determined by a human labeler to generate labeled training data to train the machine learned model. Moreover, the labels may be applied based on training data indicative of previous faults and/or replaced components. For example, the audio data associated with a component that failed may be classified for use by the machine learning model to identify faults in the future. As such, the first audio data (as well as other audio data associated with other vehicles), may be used as training data. The training data may include a designation of an operating status of the component (e.g., fair, poor, healthy, defective, etc.) that the training data is representative of. The designation of the operating status may be any of the operating status indications and may be based on the previously stored log data and/or fault logs associated with the component.

In some instances, the trained machine learned model may reside in memory that is stored locally at the vehicle, such as on a vehicle computing device, and/or may reside in memory that is stored remotely from the vehicle, such as on a server computing device or a computing device associated with a remote monitoring system of the vehicle.

At 610, the process 600 may include receiving second audio data associated with the component. The second audio data may be used for further training the machine learning model to identify a health of the component. In some instances, the second audio data may be received from other vehicles, or the same vehicle as the first audio data. As such, the machine learned model may be continuously trained to identify components that are properly functioning or are not properly functioning.

Although the process 600 describes using audio data to train a machine-learned model, the process 600 may utilize sensor data generated by other sensors in the vehicle for correlating to the audio data and determining a health of the vehicle. For example, the sensor data may include IMU data, accelerometer data, image data, pressure data, temperature data, electrical voltage measurements, electrical current measurements, and the like. Here, the machine-learned model may be trained to correlate anomalies between the audio data and the sensor data for use in determining a health of the vehicle.

Figure 7:
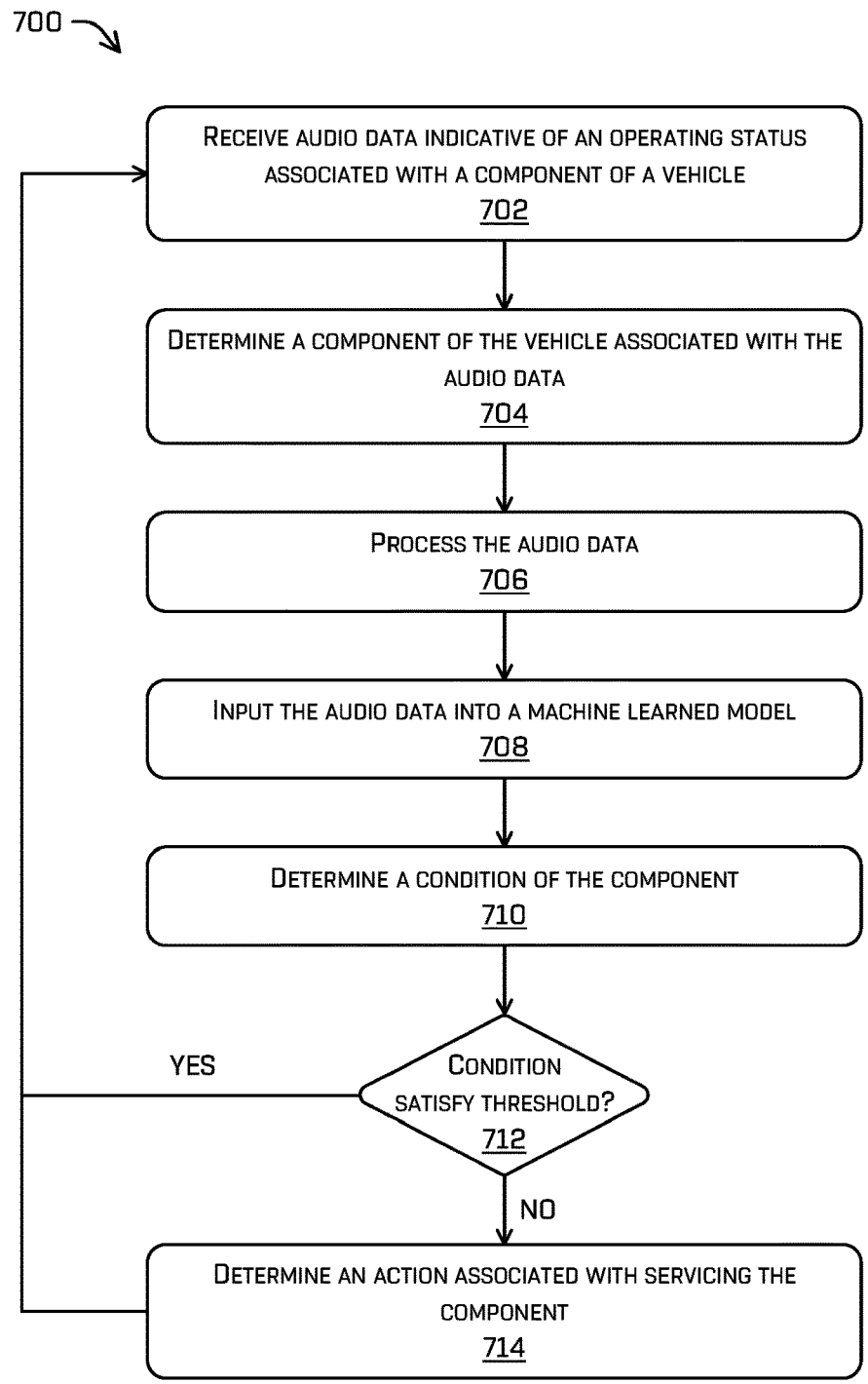
FIG. 7 illustrates an example process for using a machine learned model to monitor a health of a vehicle, or components of the vehicle, according to an example of the present disclosure.

FIG. 7 illustrates an example process 700 for using a machine learned model to monitor vehicle health.

At 702, the process 700 may include receiving audio data indicative of an operating status associated with a component of a vehicle. In some instances, the audio data may include log data that was captured by microphones of a vehicle as part of an EOL test, or during scheduled intervals (e.g., before the vehicle is put into service, etc.). In at least one example, the audio data may be captured during a test mode of a vehicle by activating the component of the vehicle and capturing audio data associated with the component via microphones of the vehicle. In some instances, the audio data may be received at a computing device of the vehicle, such as vehicle computing device(s) 404, and/or at a remote computing device, such as computing device(s) 440. Additionally, or alternatively, the audio data may be stored in a memory of the vehicle computing device(s) 404 and later uploaded to the computing device(s) 440.

At 704, the process 700 may include determining a component of the vehicle that is associated with generating the audio data. For example, the process 700 may determine a component of the vehicle, such as a brake system, HVAC system, etc. that produced sound captured by the microphones. In some instances, the process 700 may determine which component the audio data is associated with by accessing a testing sequence associated with the EOL test. That is, knowing which components of the vehicle are activated, the process 700 may determine which component the audio data is associated with. In some instances, the process 700 may also analyze the audio data to determine which component(s) generated sound associated with the audio data.

At 706, the process 700 may include processing the audio data. For example, the audio data may be processed by applying a FFT and/or one or more filters (e.g., critical band filter, ⅓ octave filter, etc.). In some instances, processing the audio data may filter out background noise, isolate sound of the component, and/or allow psychoacoustics of the audio data to be analyzed.

At 708, the process may include inputting the audio data into a machine learned model. The machine learned model may be previously trained to identify a health of the vehicle component based on past training data. In some instances, the machine learned model may analyze acoustic characteristics, such as an audio signature, of the audio data (e.g., decibel level, prominence ratio, sharpness, etc.) to determine the health of the vehicle component. Additionally, the machine learned model may analyze the audio data in comparison to stored audio data to determine whether the sound generated by the component is indicative of a healthy vehicle component, or whether the component needs to be serviced or repaired. In some instances, the machine learned model may be determined based on operating conditions of the vehicle, or operating conditions in which the audio data was captured (e.g., vehicle stationary, vehicle in transmit, windows down, settings of the component, and so forth). Moreover, in some instances, the machine learned model may be configured to accept additional forms of data an inputs for use in identifying the health of the vehicle component. By way of example, the machine learned model may accept environment data (e.g., weather conditions), mileage data (e.g., odometer), information associated with the vehicle (e.g., size, number of occupants, etc.), and so forth. In some instances, based on the data available, or the specifics of the data (e.g., weather), a specific machine learned model may be selected for determining the health of the vehicle component. For example, if the vehicle has traveled 5,000 miles, a machine learned model associated with this mileage may be selected for inputting the audio data to determine the health of the vehicle component.

At 710, the process 700 may include determining a condition of the component. In some instances, the condition may be indicative of whether the component is performing as expected (e.g., within a certain tolerance or range) or whether the component is not performing as expected (e.g., outside the certain tolerance or range). In other words, the process 700 may use sound generated by the component to determine whether the component is healthy, or whether the component needs to be replaced. In some instances, the condition of the component may indicate a remaining life of the component, or an amount of time before the component needs to be replaced (e.g., one week, 1,000 miles, etc.).

At 712, the process 700 may determine whether the condition satisfies a threshold. For example, the condition may be compared (or otherwise analyzed) against a threshold prior to commissioning the vehicle. In some instances, the threshold may be associated with a decibel level, a prominence ratio, a sharpness, and the like. For example, if the component generates sound with a decibel level of 40 dBA, this decibel level may be compared against a threshold. If the condition satisfies the threshold, the component may be deemed to be properly functioning and the process 700 may follow the "YES" route and proceed to 702. From 702, the process may continue to receive audio data as generated by the component for use in determining the health of the component. Additionally, or alternatively, audio data associated with the component and/or other components may be captured for use in inputting to a respective machine learned model to determine whether the additional components are healthy. In some instances, the condition may be representative of a state, or status, of the component and the status may be analyzed to determine whether the vehicle is safe to operate. For example, if the component is functional, the component may be deemed to be safe for operating.

Alternatively, if at 712 the process 700 determines that the condition did not satisfy the threshold, the process 700 may follow the "NO" route and proceed to 714. At 714, the process 700 may determine an action associated with servicing the component. For example, the component may be replaced or maintenance may be performed on the component. Additionally, or alternatively, in some instances, the process 700 may perform one or more remedial actions for lessening the sound. For example, doors of the vehicle may be closed with a higher amount of force, tire pressure may be increased, and so forth. In some instances, this may reduce perceived noise to the occupants in the vehicle.

Figure 8:
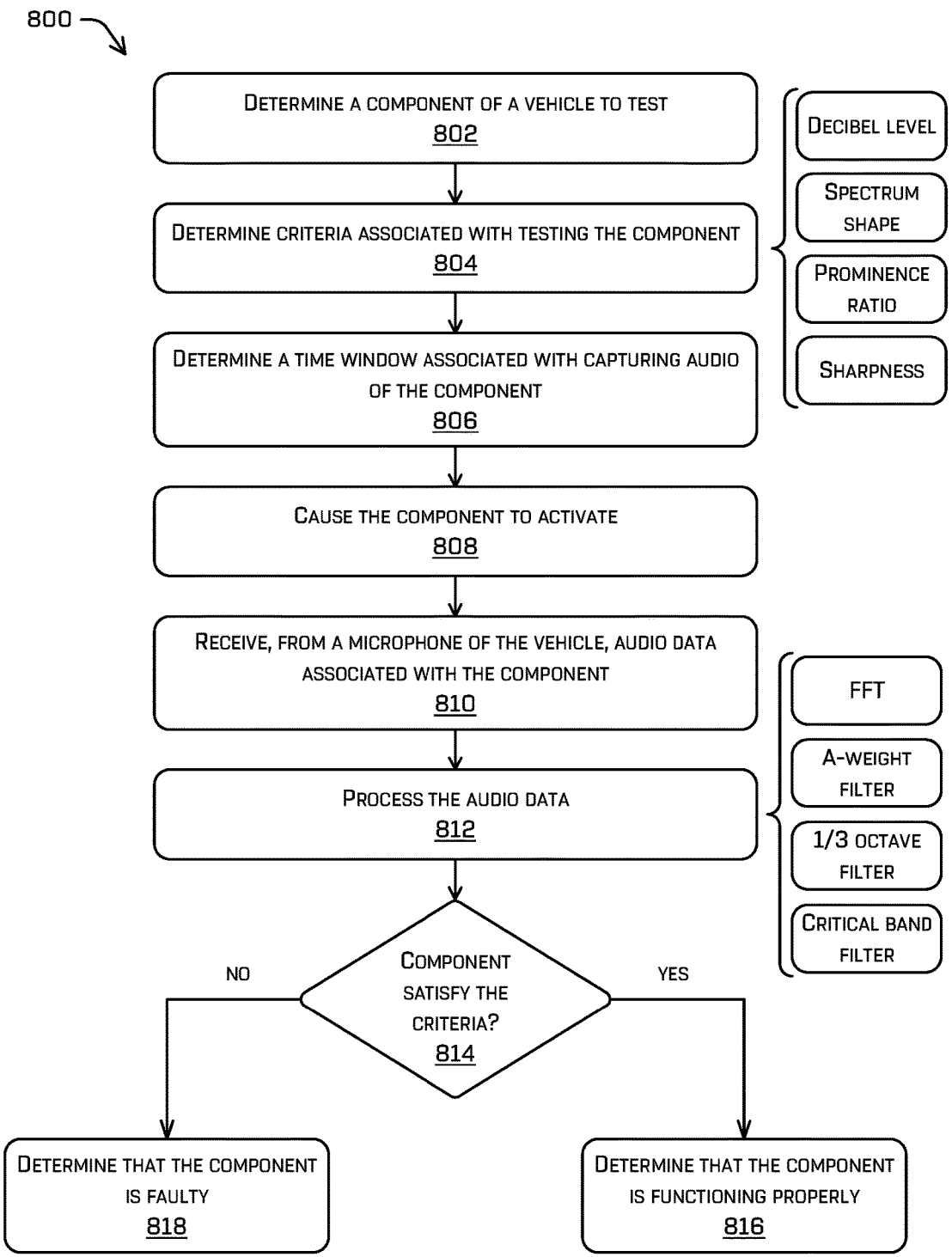
FIG. 8 illustrates an example process for monitoring a health of a vehicle, or components of the vehicle, according to an example of the present disclosure.

FIG. 8 illustrates an example process 800 for determining a health of components of the vehicle 100. At 802, the process 800 may determine of a component of a vehicle to test, such as a cooling fan and pump. In some instances, testing the component may be part of a testing sequence associated with determining a health of the vehicle. That is, as part of determining a health of the vehicle, the cooling fan and pump may be tested.

At 804, the process 800 may include determining criteria associated with testing the component. In some instances, the criteria may include determining a decibel level of sound generated by the component, a spectrum shape of an audio signature (a portion thereof) associated with the component, a prominence ratio of sound generated by the component, and/or a sharpness of the sound generated by the component. In some instances, the process 800 may compare the criteria to sound generated by the component. For example, the component may be associated with an audio signature that indicates the decibel level, the prominence ratio, the spectrum shape, and/or the sharpness. The criteria may be accessed at a later instance when testing the component. In some instances, the criteria may indicate acceptable ranges, or thresholds, of the decibel level, the spectrum shape, prominence ratio, and/or the sharpness. In some instances, the acceptable ranges, or thresholds, of the components may be indicative of components that are properly functioning. As such, by comparing sound generated by the component to the criteria, the process 800 may determine whether the component is functioning properly.

In some instances, the overall decibel level and/or the spectrum shape may be indicative of an objective analysis of the audio data, whereas the prominence ratio and the sharpness may be indicative of a subjective analysis of the audio as perceived by the human ear.

At 806, the process 800 may include determining a time window associated with capturing audio of the component. In some instances, the time window may be based at least in part on the component under test, and/or the criteria to which the component is being compared. The time window may represent a period of time in which the component is activated, between an on state and an off state. The time window may be of sufficient length to ensure that audio of the component is captured for comparison to the criteria.

At 808, the process 800 may include causing the component to activate. For example, if the component is the cooling fan and pump, then the vehicle may cause the cooling fan and pump to turn on. This may include causing the component to activate to a known or commanded state (e.g., speed). The amount of time the component is activated may be dependent on the time window over which the audio of the component is measured. In some instances, the other systems or components of the vehicle may be deactivated while activating the cooling fan and pump in order to isolate a portion of audio data attributable to the cooling fan and pump being activated. For example, an air suspension compressor and/or an AC compressor may be turned off. However, in some instances, the air suspension compressor and/or the AC compressor may be activated while the component is activated and sound associated with the air suspension compressor and the AC compressor may be filtered out.

At 810, the process 800 may include receiving, from a microphone of the vehicle, audio data associated with the component. The microphones may be located within an interior of the vehicle to capture sound as perceived by occupants of the vehicle. In other words, by capturing sound within the interior of the vehicle (e.g., a passenger compartment) the sound generated by the cooling fan and pump, as perceived by the occupant, may be measured. In some instances, the audio data may be received during the time window associated with capturing the audio of the component.

At 812, the process 800 may include processing the audio data. For example, the audio data captured at 810 may include raw audio data. As such, the audio data may be processed to generate processed audio data. In some instances, processing the audio data may include applying a FFT, an A-weight filter, an octave filter, and/or a critical band filter. The FFT may convert the audio data into individual spectral components to provide frequency information. The A-weight filter may apply weight to frequency components at which the human ear is more sensitive. That is, the A-weight filter may process the audio data to within an audible range at which the human ear perceives sound. The ⅓ octave band filter may split the audible spectrum into smaller bands, identifying the frequency content of the sound generated by the component. The critical band filter may represent an octave filter. The processing of the audio data may process the audio data such that psychoacoustic properties of the audio data may be analyzed. For example, by processing the audio data, sound quality metrics of the audio data may be determined to describe the sound (e.g., rough or sharp).

At 814, the process 800 may determine whether the component satisfies the criteria. This may include comparing the processed audio data with the criteria. For example, a peak decibel level of the audio data may be compared against a threshold. For example, the threshold decibel of the cooling fan and pump may be 32 dBA. If the audio generated by the cooling fan and pump is greater than 32 dBA, the cooling fan and pump may be determined to be faulty. That is, the cooling fan and pump may be generating sound that is greater than expected. Likewise, the spectrum shape, the prominence ration, and/or the sharpness may be compared against similar thresholds. In some instances, the comparison may include a comparison within the digital and/or audio domains. Additionally, or alternatively, the comparison may involve comparing frequency domains of the audio data to that of like threshold frequency ranges. In some instances, the criteria may be analyzed to determine whether the component is similar to the criteria (e.g., healthy component or unhealthy component) for determining the status of the component. In some instances, the process 800 may determine whether the component satisfies some or all of the criteria.

If at 814 the process 800 determines that the component satisfies the criteria, the process 800 may follow the "YES" route and proceed to 816. At 816, the process 800 may determine that the component is functioning properly. In such instances, the vehicle may be commissioned or put into use. Other components of the vehicle may also be tested and/or the component of the vehicle may be tested under other operating conditions (e.g., vehicle in motion) for comparison to other respective audio signals. Alternatively, if at 814 the process 800 determines that the component does not satisfy the criteria, the process 800 may follow the "NO" route and proceed to 818. At 818, the process 800 may determine that the component is faulty. In some instances, as a result, the process 800 may proceed to schedule maintenance on the component. Additionally, or alternatively, other components of the vehicle may be tested.

In some instances, the process 800 may capture multiple audio data while testing the component. For example, audio data may be generated while the vehicle is stationary, and while the vehicle is in transit. In each instances, the audio data may be compared against respective criteria. For example, it is envisioned that while the vehicle is in transmit, the components may produce louder noises. In some instances, the component may be deemed to be functioning properly based on satisfying first criteria while the vehicle is stationary, and/or based on satisfying second criteria while the vehicle is in transit.

EXAMPLE CLAUSES

The following paragraphs describe various examples. Any of the examples in this section may be used with any other of the examples in this section and/or any of the other examples or embodiments described herein.

A: A vehicle system comprising: a microphone; a vehicle component; one or more processors; and one or more non-transitory computer-readable media storing instructions that, when executed by the one or more processors, cause the one or more processors to perform operations comprising: determining a first audio signature associated with testing the vehicle component, the first audio signature being representative of the vehicle component functioning properly; causing the vehicle component to be activated; receiving, from the microphone, audio data associated with the vehicle component while activated; determining, based at least in part on the audio data, a second audio signature associated with the vehicle component; comparing the first audio signature and the second audio signature; and determining, based at least in part on the comparing, a condition of a vehicle or the vehicle component.

B: The vehicle system of paragraph A, the operations further comprising determining, based at least in part on the vehicle component being tested, a time window associated with capturing the audio data, and wherein the microphone captures the audio data during the time window.

C: The vehicle system of paragraph A or B, the operations further comprising processing the audio data, wherein processing the audio data comprises at least one of: applying a Fourier transform; applying an A-weight filter; applying a critical band filter; or applying a ⅓ octave band filter.

D: The vehicle system of any of paragraphs A-C, wherein comparing the first audio signature and the second audio signature comprises at least one of: determining a first similarity between a first decibel level of the first audio signature and a second decibel level of the second audio signature; determining a second similarity between a first prominence ratio of the first audio signature and a second prominence ratio of the second audio signature; determining a third similarity between a first sharpness of the first audio signature and a second sharpness of the second audio signature; or determining a fourth similarity between a first spectrum of the first audio signature and a second spectrum shape of the second audio signature.

E: The vehicle system of any of paragraphs A-D, the operations further comprising: determining a test sequence for testing the vehicle, the testing sequence including testing the vehicle component at a first instance in time and testing a second vehicle component at a second instance in time that is after the first instance in time; causing the second vehicle component to be activated, wherein the second vehicle component is a different type of component as the vehicle component; receiving, from the microphone, second audio data associated with the second vehicle component; and based at least in part on the second audio data, determining a second condition of the vehicle or the second vehicle component.

F: A method comprising: causing a component of a vehicle to enter a commanded state; receiving audio data generated by a microphone of the vehicle, the audio data representing sound generated at least in part by the component while in the commanded state; and determining, based at least in part on the audio data, a condition of the vehicle or the component.

G: The method of paragraph F, wherein the component comprises a first component, the method further comprises: determining, based at least in part on the audio data, a first audio signature associated with the component; determining a second audio signature associated with a second component, the second component being a same type of component as the first component; and determining a similarity between the second audio signature and the first audio signature, wherein determining the condition of the vehicle or the component is based at least in part on the similarity.

H: The method of paragraph F or G, further comprising: determining that the similarity is less than a threshold similarity; and determining to decommission the vehicle based at least in part on the similarity being less than the threshold similarity.

I: The method of any of paragraphs F-H, wherein the sound comprises human-perceivable sound, the method further comprises determining, based at least in part on the audio data, at least one characteristic of the human-perceivable sound, and wherein determining the condition of the vehicle or the component comprises determining the condition of the vehicle based at least in part on the at least one characteristic.

J: The method of any of paragraphs F-I, further comprising: determining a component type of the component; and determining, based at least in part on the component type, a time window associated with the microphone capturing the audio data.

K: The method of any of paragraphs F-J, further comprising processing the audio data by applying at least one of: a Fourier transform; an A-weight filter; a critical band filter; or a ⅓ octave band filter.

L: The method of any of paragraphs F-K, wherein determining the condition of the vehicle or the component comprises determining at least one of: a decibel level of the sound represented within the audio data; a spectrum shape associated with the audio data; a prominence ratio associated with the audio data; or a sharpness associated with the audio data.

M: The method of any of paragraphs F-L, wherein determining the condition of the vehicle or the component comprises: providing the audio data as an input to a machine learned model; and generating, as an output from the machine learned model, a probability representing a likelihood of the condition of the vehicle or the component.

N: The method of any of paragraphs F-M, wherein the component comprises a first component, the commanded state comprises a first commanded state, the condition comprises a first condition, and the audio data comprises first audio data, the method further comprises: causing a second component of the vehicle to enter a second commanded state; receiving second audio data generated by the microphone of the vehicle, the second audio data representing sound generated at least in part by the second component while in the second commanded state, the second audio data being generated by the microphone during a time window that at least partially overlaps with the first audio data being generated by the microphone; and determining, based at least in part on the second audio data, a second condition of the second component.

O: One or more non-transitory computer readable media storing instructions executable by a processor, wherein the instructions, when executed, cause the processor to perform operations comprising: causing a component of a vehicle to enter a commanded state; receiving audio data generated by a microphone of the vehicle, the audio data representing sound generated at least in part by the component while in the commanded state; and determining, based at least in part on the audio data, a condition of the vehicle or the component.

P: The one or more non-transitory computer readable media of paragraph O, wherein the component comprises a first component, the operations further comprising: determining, based at least in part on the audio data, a first audio signature associated with the component; determining a second audio signature associated with a second component, the second component being a same type of component as the first component; and determining a similarity between the second audio signature and the first audio signature, wherein determining the condition of the vehicle or the component is based at least in part on the similarity.

Q: The one or more non-transitory computer readable media of paragraph O or P, the operations further comprising: determining that the similarity is less than a threshold similarity; and determining to decommission the vehicle based at least in part on the similarity being less than the threshold similarity.

R: The one or more non-transitory computer readable media of any of paragraphs O-Q, wherein determining the condition of the vehicle or the component comprises: providing the audio data as an input to a machine learned model; and generating, as an output from the machine learned model, a probability representing a likelihood of the condition of the vehicle or the component.

S: The one or more non-transitory computer readable media of any of paragraphs O-R, wherein determining the condition of the vehicle or the component comprises determining at least one of: a decibel level of the sound represented within the audio data; a spectrum shape associated with the audio data; a prominence ratio associated with the audio data; or a sharpness associated with the audio data.

T: The one or more non-transitory computer readable media of any of paragraphs O-S, the operations further comprising processing the audio data by applying at least one of: a Fourier transform; an A-weight filter; a critical band filter; or a ⅓ octave band filter.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A vehicle system comprising:
 a microphone;
 a vehicle component;
 one or more processors; and
 one or more non-transitory computer-readable media storing instructions that, when executed by the one or more processors, cause the one or more processors to perform operations comprising:
  determining a first audio signature associated with testing the vehicle component, the first audio signature being representative of the vehicle component functioning properly;
  causing the vehicle component to be activated;
  receiving, from the microphone, audio data associated with the vehicle component while activated;
  determining, based at least in part on the audio data, a second audio signature associated with the vehicle component;
  comparing the first audio signature and the second audio signature; and
  determining, based at least in part on the comparing, a condition of a vehicle or the vehicle component.

2. The vehicle system of claim 1, the operations further comprising determining, based at least in part on the vehicle component being tested, a time window associated with capturing the audio data, and wherein the microphone captures the audio data during the time window.

3. The vehicle system of claim 1, the operations further comprising processing the audio data, wherein processing the audio data comprises at least one of:
 applying a Fourier transform;
 applying an A-weight filter;
 applying a critical band filter; or
 applying a ⅓ octave band filter.

4. The vehicle system of claim 1, wherein comparing the first audio signature and the second audio signature comprises at least one of:
 determining a first similarity between a first decibel level of the first audio signature and a second decibel level of the second audio signature;
 determining a second similarity between a first prominence ratio of the first audio signature and a second prominence ratio of the second audio signature;
 determining a third similarity between a first sharpness of the first audio signature and a second sharpness of the second audio signature; or
 determining a fourth similarity between a first spectrum of the first audio signature and a second spectrum shape of the second audio signature.

5. The vehicle system of claim 1, the operations further comprising:
 determining a test sequence for testing the vehicle, the testing sequence including testing the vehicle component at a first instance in time and testing a second vehicle component at a second instance in time that is after the first instance in time;
 causing the second vehicle component to be activated, wherein the second vehicle component is a different type of component as the vehicle component;
 receiving, from the microphone, second audio data associated with the second vehicle component; and
 based at least in part on the second audio data, determining a second condition of the vehicle or the second vehicle component.

6. A method comprising:
 determining a first audio signature associated with a component of a vehicle, the first audio signature being representative of the component functioning properly;
 causing the component to enter a commanded state;
 receiving audio data generated by a microphone of the vehicle, the audio data representing sound generated at least in part by the component while in the commanded state;
 determining, based at least in part on the audio data, a second audio signature associated with the component; and
 determining, based at least in part on comparing the first audio signature and the second audio signature, a condition of the vehicle or the component.

7. The method of claim 6, further comprising determining a similarity between the second audio signature and the first audio signature, wherein determining the condition of the vehicle or the component is based at least in part on the similarity.

8. The method of claim 7, further comprising:
determining that the similarity is less than a threshold similarity; and
determining to decommission the vehicle based at least in part on the similarity being less than the threshold similarity.

9. The method of claim 6, wherein the sound comprises human-perceivable sound, the method further comprises determining, based at least in part on the audio data, at least one characteristic of the human-perceivable sound, and wherein determining the condition of the vehicle or the component comprises determining the condition of the vehicle based at least in part on the at least one characteristic.

10. The method of claim 6, further comprising:
determining a component type of the component; and
determining, based at least in part on the component type, a time window associated with the microphone capturing the audio data.

11. The method of claim 6, further comprising processing the audio data by applying at least one of:
a Fourier transform;
an A-weight filter;
a critical band filter; or
a ⅓ octave band filter.

12. The method of claim 6, wherein determining the condition of the vehicle or the component comprises determining at least one of:
a first similarity between a first decibel level associated with the first audio signature and a second decibel level associated with the second audio signature;
a second similarity between a first spectrum shape associated with the first audio signature and a second spectrum shape associated with the second audio signature;
a third similarity between a first prominence ratio associated with the first audio signature and a second prominence ratio associated with the second audio signature; or
a fourth similarity between a first sharpness associated with the first audio signature and a second sharpness associated with the second audio signature.

13. The method of claim 6, wherein determining the condition of the vehicle or the component comprises:
providing at least one of the audio data or the second audio signature as an input to a machine learned model; and
generating, as an output from the machine learned model, a probability representing a likelihood of the condition of the vehicle or the component.

14. The method of claim 6, wherein the component comprises a first component, the commanded state comprises a first commanded state, the condition comprises a first condition, and the audio data comprises first audio data, the method further comprises:
causing a second component of the vehicle to enter a second commanded state;
receiving second audio data generated by the microphone of the vehicle, the second audio data representing sound generated at least in part by the second component while in the second commanded state, the second audio data being generated by the microphone during a time window that at least partially overlaps with the first audio data being generated by the microphone; and
determining, based at least in part on the second audio data, a second condition of the second component.

15. One or more non-transitory computer readable media storing instructions executable by a processor, wherein the instructions, when executed, cause the processor to perform operations comprising:
determining a first audio signature associated with a component of a vehicle, the first audio signature being representative of the component functioning properly;
causing the component to enter a commanded state;
receiving audio data generated by a microphone of the vehicle, the audio data representing sound generated at least in part by the component while in the commanded state;
determining, based at least in part on the audio data, a second audio signature associated with the component; and
determining, based at least in part on comparing the first audio signature and the second audio signature, a condition of the vehicle or the component.

16. The one or more non-transitory computer readable media of claim 15, the operations further comprising determining a similarity between the second audio signature and the first audio signature, wherein determining the condition of the vehicle or the component is based at least in part on the similarity.

17. The one or more non-transitory computer readable media of claim 16, the operations further comprising:
determining that the similarity is less than a threshold similarity; and
determining to decommission the vehicle based at least in part on the similarity being less than the threshold similarity.

18. The one or more non-transitory computer readable media of claim 15, wherein determining the condition of the vehicle or the component comprises:
providing at least one of the audio data or the second audio signature as an input to a machine learned model; and
generating, as an output from the machine learned model, a probability representing a likelihood of the condition of the vehicle or the component.

19. The one or more non-transitory computer readable media of claim 15, wherein determining the condition of the vehicle or the component comprises determining at least one of:
a first similarity between a first decibel level associated with the first audio signature and a second decibel level associated with the second audio signature;
a second similarity between a first spectrum shape associated with the first audio signature and a second spectrum shape associated with the second audio signature;
a third similarity between a first prominence ratio associated with the first audio signature and a second prominence ratio associated with the second audio signature; or
a fourth similarity between a first sharpness associated with the first audio signature and a second sharpness associated with the second audio signature.

20. The one or more non-transitory computer readable media of claim 15, the operations further comprising processing the audio data by applying at least one of:
a Fourier transform;
an A-weight filter;
a critical band filter; or
a ⅓ octave band filter.

* * * * *